(12) United States Patent (10) Patent No.: US 12,664,297 B2
Cole et al. (45) Date of Patent: Jun. 23, 2026

(54) ATTRIBUTE-BASED PERMISSIONS GROUPS

(71) Applicant: Procore Technologies, Inc.,
Carpinteria, CA (US)

(72) Inventors: Terrence Cole, Santa Barbara, CA
(US); Lee Hollingworth, Clayton, CA
(US)

(73) Assignee: Procore Technologies, Inc.,
Carpinteria, CA (US)

( * ) Notice: Subject to any disclaimer, the term of this
patent is extended or adjusted under 35
U.S.C. 154(b) by 158 days.

(21) Appl. No.: 18/345,498

(22) Filed: Jun. 30, 2023

(65) Prior Publication Data

US 2025/0005185 A1     Jan. 2, 2025

(51) Int. Cl.
G06F 21/00          (2013.01)
G06F 21/62          (2013.01)
(52) U.S. Cl.
CPC .. G06F 21/6218 (2013.01); G06F 2221/2141
(2013.01)
(58) Field of Classification Search
CPC ........ G06F 21/60; G06F 21/604; G06F 21/62;
G06F 21/6209; G06F 21/6218; G06F
2221/2141; H04L 63/104; H04L 63/105
See application file for complete search history.

(56) References Cited

U.S. PATENT DOCUMENTS

2017/0177889  A1*   6/2017  Faulkner ............... G06Q 10/10
2022/0179986  A1*   6/2022  Veeramachaneni ... G06F 3/0637
2024/0427917  A1*  12/2024  Strange .................. H04L 63/08

OTHER PUBLICATIONS

Pang, Ruoming et al., "Zanzibar: Google's Consistent, Global
Authorization System", 2019 USENIX Annual Technical Confer-
ence (USENIX ATC '19), 2019, pp. 1-14.

* cited by examiner

*Primary Examiner* — Joseph P Hirl
*Assistant Examiner* — Chi D Nguy
(74) *Attorney, Agent, or Firm* — Lee Sullivan Shea &
Smith LLP

(57)          ABSTRACT
A computing platform is configured to (i) receive configu-
ration data defining a permissions group for a construction
project, the configuration data indicating a data domain and
a set of actions performable on data objects within the data
domain that have a particular value for a particular data
object attribute, (ii) after receiving the configuration data,
receive a data access request, on behalf of a user account, for
a data object within the data domain, (iii) determine that the
user account is a member of the permissions group, (iv)
determine that the data object has the particular data object
attribute with the particular value and thereby satisfies the
condition, and (v) based on determining that (a) the user
account is a member of the permissions group and (b) the
data object satisfies the condition, determine that the user
account is permitted to perform the set of actions on the data
object.

20 Claims, 9 Drawing Sheets

Figure 4:
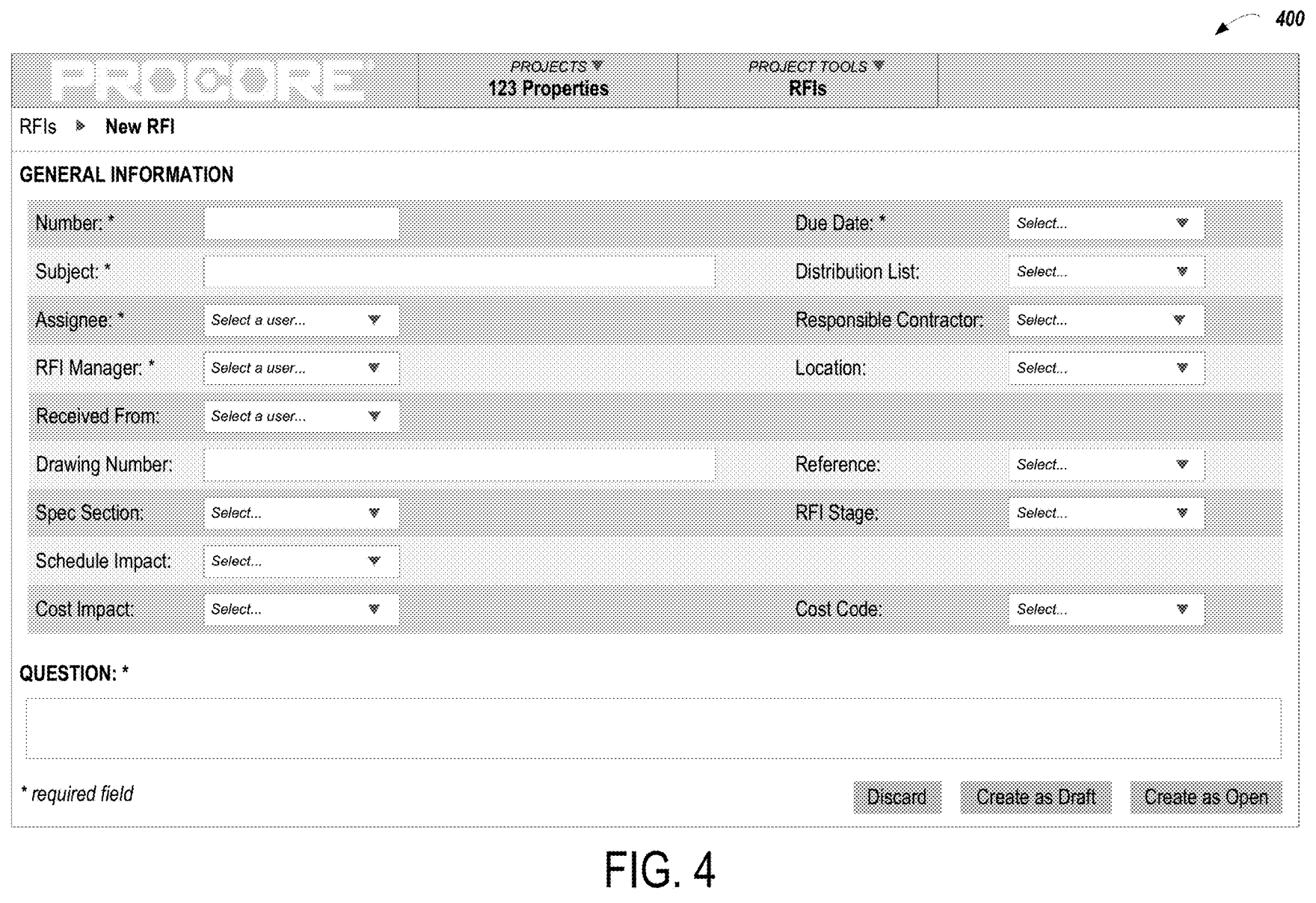

PROCORE

RFIs ▶ New RFI

GENERAL INFORMATION

Number: *

Subject: *

Assignee: *                    Select a user... ▼

RFI Manager: *                 Select a user... ▼

Received From:                 Select a user... ▼

Drawing Number:

Spec Section:                  Select... ▼

Schedule Impact:               Select... ▼

Cost Impact:                   Select... ▼

Due Date: *                    Select... ▼

Distribution List:             Select... ▼

Responsible Contractor:        Select... ▼

Location:                      Select... ▼

Reference:                     Select... ▼

RFI Stage:                     Select... ▼

Cost Code:                     Select... ▼

QUESTION: *

* required field

Discard     Create as Draft     Create as Open

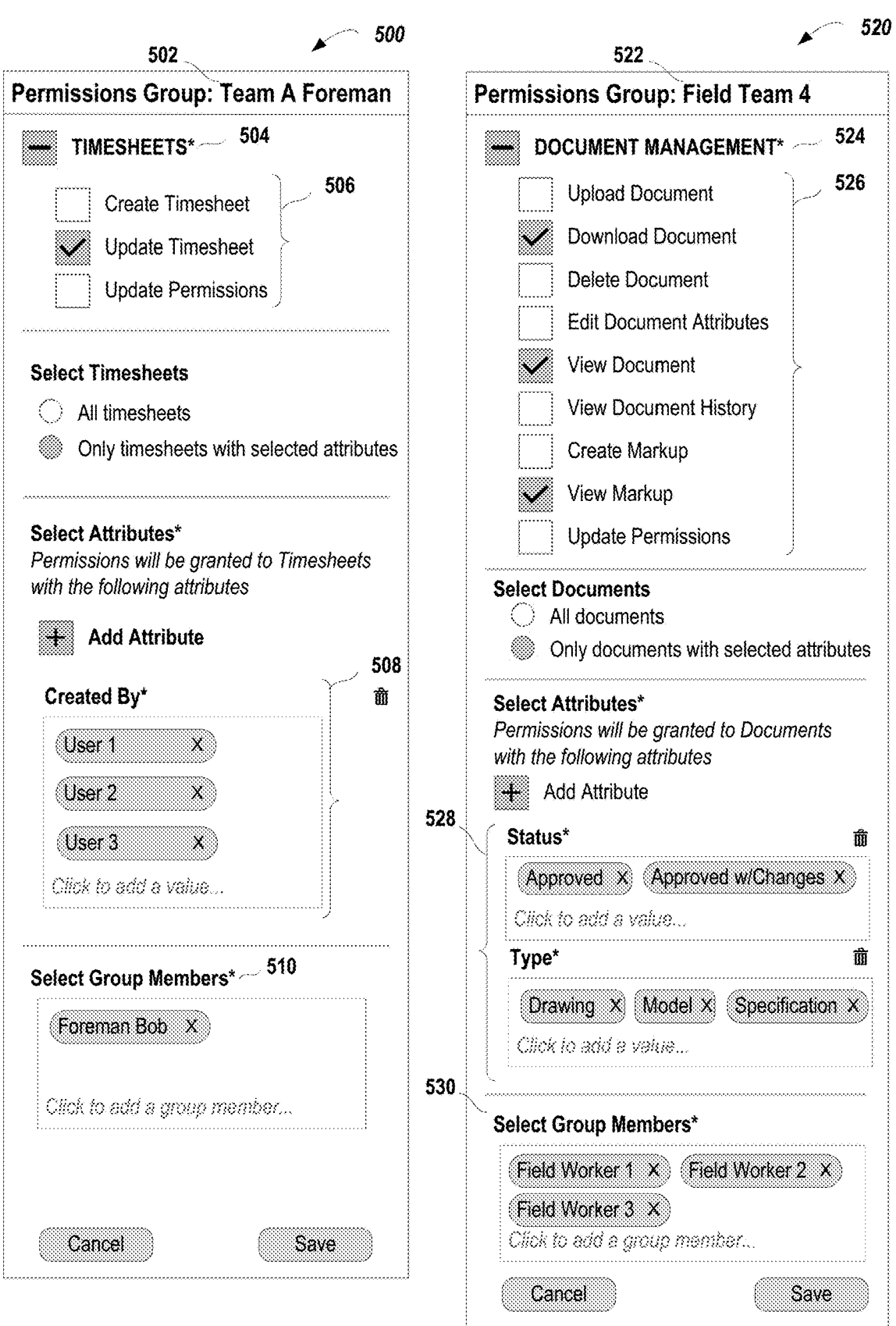
FIG. 5A                          FIG. 5B

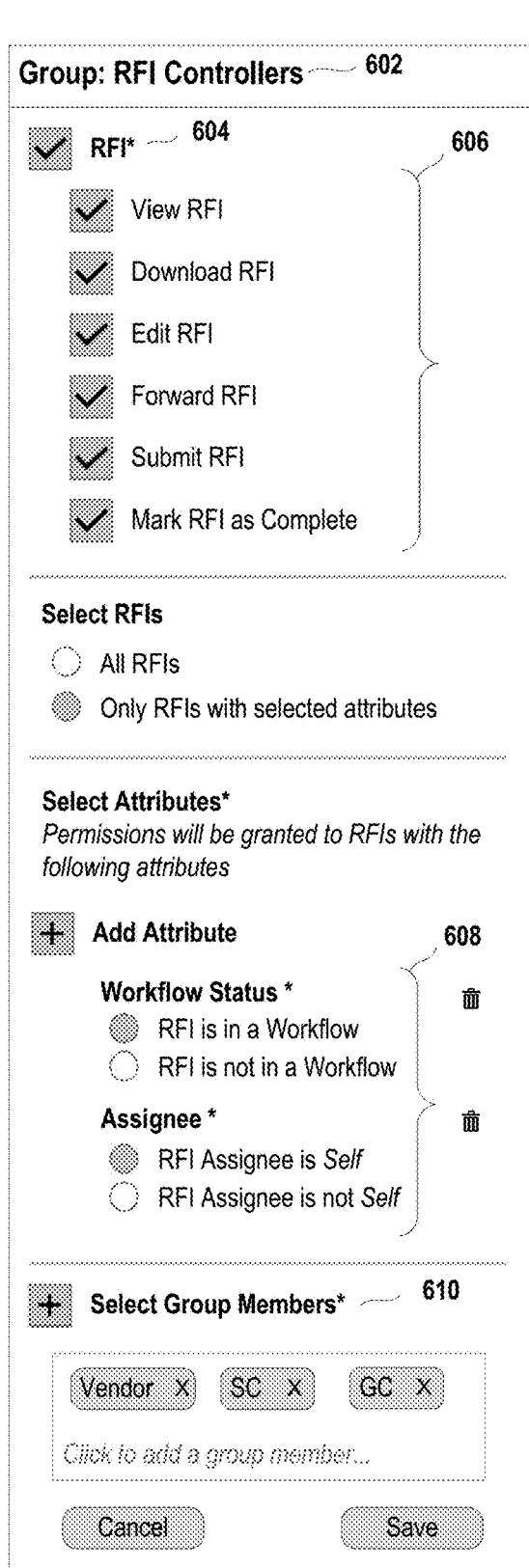

Group: RFI Controllers — 602

☑ RFI* — 604     606

☑ View RFI
    ☑ Download RFI
    ☑ Edit RFI
    ☑ Forward RFI
    ☑ Submit RFI
    ☑ Mark RFI as Complete

Select RFIs

◯ All RFIs
◉ Only RFIs with selected attributes

Select Attributes\*
*Permissions will be granted to RFIs with the following attributes*

⊞ Add Attribute     608

Workflow Status \*     🗑
       ◉ RFI is in a Workflow
       ◯ RFI is not in a Workflow
    Assignee \*     🗑
       ◉ RFI Assignee is *Self*
       ◯ RFI Assignee is not *Self*

⊞ Select Group Members* — 610

[ Vendor X ] [ SC X ] [ GC X ]

*Click to add a group member...*

( Cancel )     ( Save )

Group: RFI Bystanders — 622

▬ RFI* — 624     626

☑ View RFI
    ☐ Download RFI
    ☐ Edit RFI
    ☐ Forward RFI
    ☐ Submit RFI
    ☐ Mark RFI as Complete

Select RFIs

◯ All RFIs
◉ Only RFIs with selected attributes

Select Attributes\*
*Permissions will be granted to RFIs with the following attributes*

⊞ Add Attribute     628

Workflow Status \*     🗑
       ◉ RFI is in a Workflow
       ◯ RFI is not in a Workflow
    Assignee \*     🗑
       ◯ RFI Assignee is *Self*
       ◉ RFI Assignee is not *Self*

⊞ Select Group Members* — 630

[ Vendor X ] [ SC X ] [ GC X ]

*Click to add a group member...*

( Cancel )     ( Save )

Figure 8:
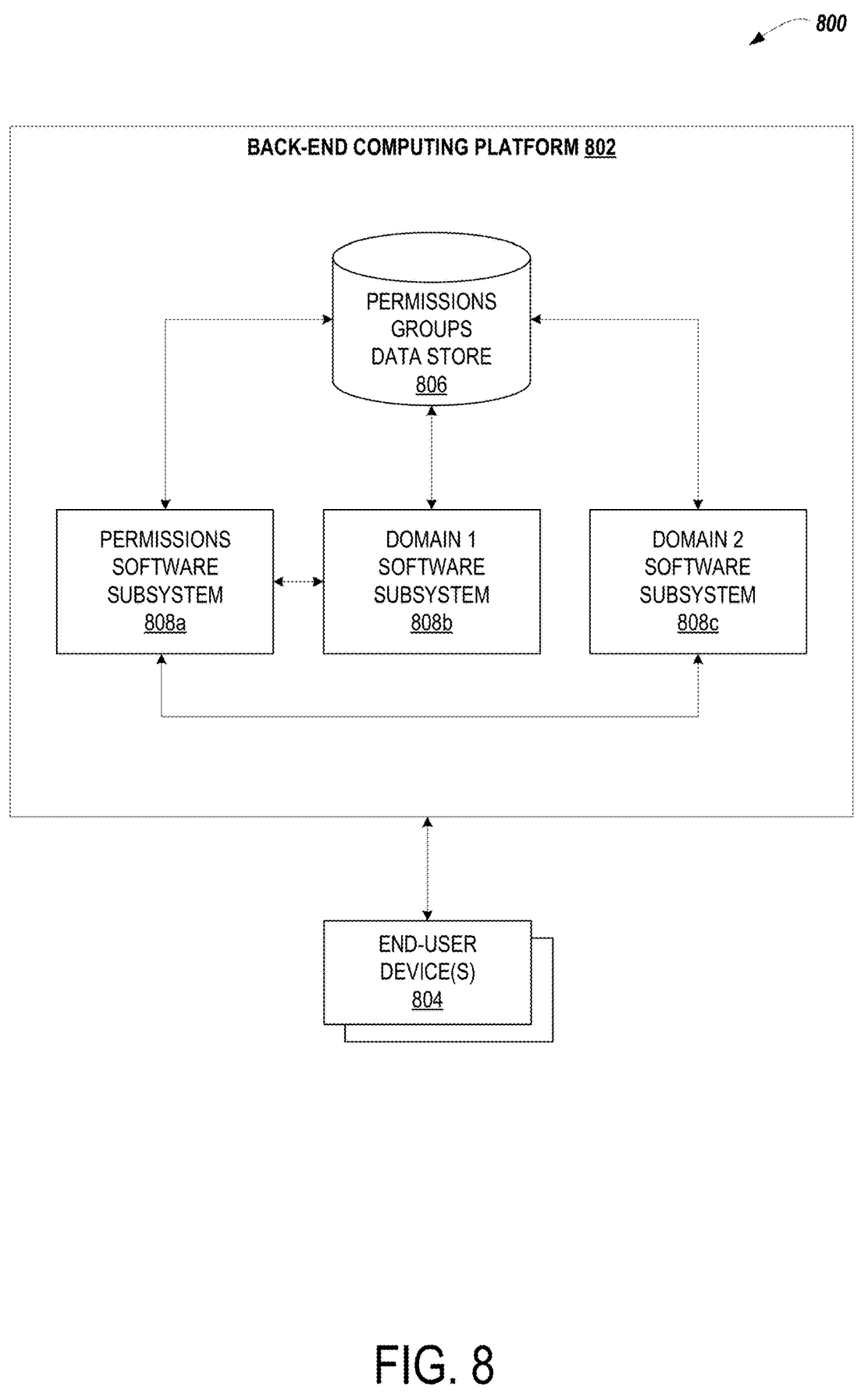

BACK-END COMPUTING PLATFORM 802

PERMISSIONS
GROUPS
DATA STORE
806

PERMISSIONS
SOFTWARE
SUBSYSTEM
808a

DOMAIN 1
SOFTWARE
SUBSYSTEM
808b

DOMAIN 2
SOFTWARE
SUBSYSTEM
808c

END-USER
DEVICE(S)
804

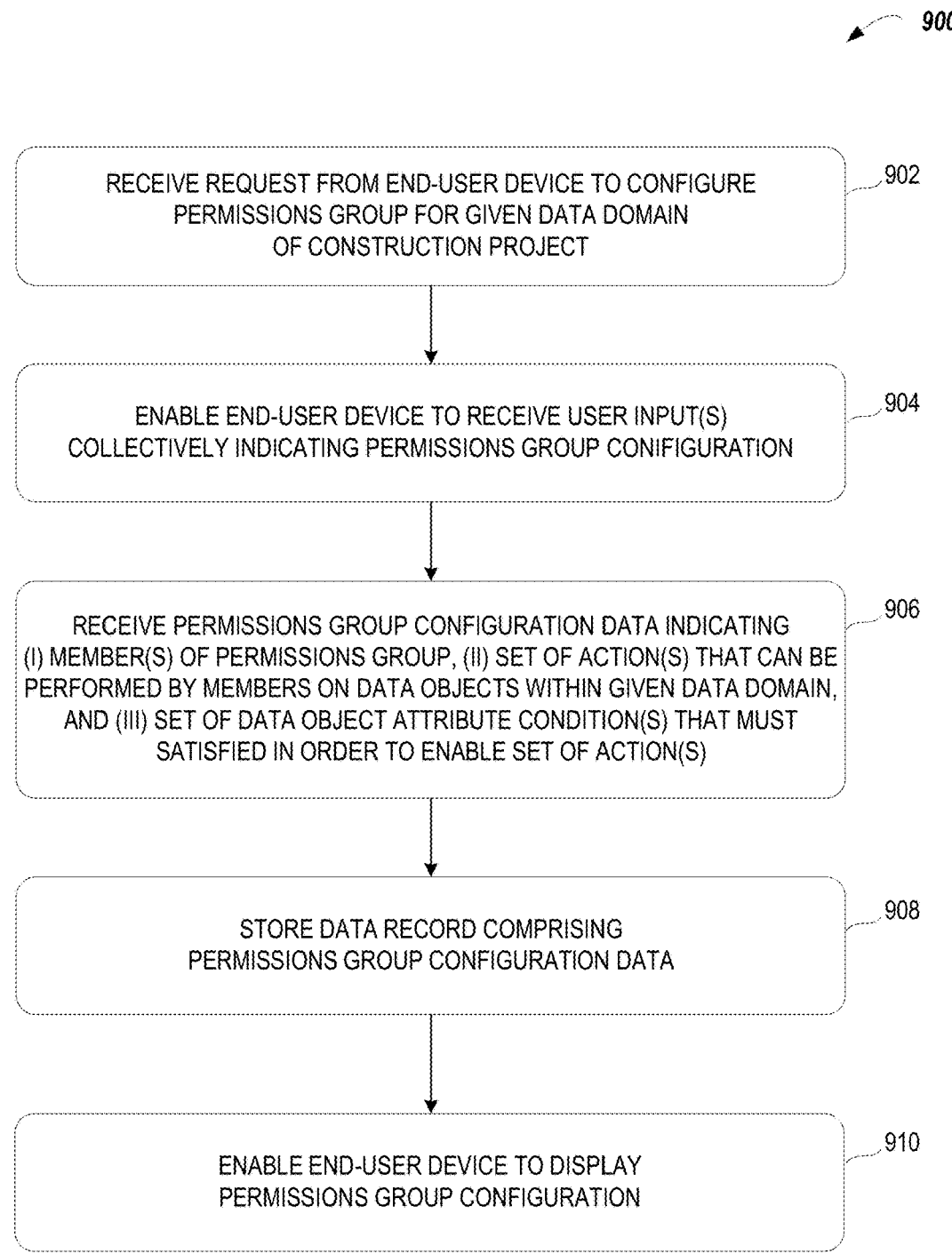

RECEIVE REQUEST FROM END-USER DEVICE TO CONFIGURE
PERMISSIONS GROUP FOR GIVEN DATA DOMAIN
OF CONSTRUCTION PROJECT
902

ENABLE END-USER DEVICE TO RECEIVE USER INPUT(S)
COLLECTIVELY INDICATING PERMISSIONS GROUP CONIFIGURATION
904

RECEIVE PERMISSIONS GROUP CONFIGURATION DATA INDICATING
(I) MEMBER(S) OF PERMISSIONS GROUP, (II) SET OF ACTION(S) THAT CAN BE
PERFORMED BY MEMBERS ON DATA OBJECTS WITHIN GIVEN DATA DOMAIN,
AND (III) SET OF DATA OBJECT ATTRIBUTE CONDITION(S) THAT MUST
SATISFIED IN ORDER TO ENABLE SET OF ACTION(S)
906

STORE DATA RECORD COMPRISING
PERMISSIONS GROUP CONFIGURATION DATA
908

ENABLE END-USER DEVICE TO DISPLAY
PERMISSIONS GROUP CONFIGURATION
910

FIG. 9

ATTRIBUTE-BASED PERMISSIONS GROUPS

BACKGROUND

Construction projects can be complex and demanding undertakings that involve intensive planning, design, and implementation throughout several discrete phases. A construction project often involves numerous different parties including project owners, general contractors, subcontractors, vendors, architects, engineers, suppliers, etc., who are each responsible for managing certain aspects of the construction project and/or performing various project-related tasks in order to help complete the construction project. Construction projects also involve a vast amount of project-related data that needs to be tracked and made accessible to the different parties in order to complete project-related tasks. Completing project-related tasks often requires coordination, communication, and collaboration between the different parties involved in a construction project, which can be difficult to manage effectively and efficiently.

Accordingly, software technology that helps to facilitate electronic collaboration between parties that are responsible for completing work related to a construction project is desirable.

OVERVIEW

As mentioned above, construction projects can be very complex, involving several different project phases and relying heavily on successful collaboration between many different parties in order to achieve project completion. For instance, a construction project can involve a large number of companies that are each responsible for handling certain aspects of the construction project, and each company may have one or more construction professionals and/or teams of construction professionals that are responsible for completing certain project-related tasks.

Many, if not all, of the tasks related to a construction project require some extent of collaboration between the different parties. For instance, parties need to be able to communicate with other parties (inter-party communication) to complete actions related to work for the construction project, such as requesting and exchanging information required to complete tasks (e.g., via a Request for Information (RFI) etc.), updating task progresses, scheduling tasks, entering billing information (e.g., timesheets, etc.), or exchanging accounting information (e.g., invoices, payment, etc.), among other possibilities. Further, parties need to be able to communicate internally (intra-party communication) to carry out actions related to their respective responsibilities for the construction project (e.g., deploy a team to an on-site location to complete a task, etc.).

In general, the construction industry as a whole is susceptible to various inefficiencies related to processing, managing, handling, and establishing connectivity between the vast amounts of data typically associated with construction projects. Frequently, these inefficiencies stem from the siloed structure of construction project data, which typically lacks unifying characteristics that can serve as common denominators to provide meaningful connectivity between construction project data.

To alleviate some of the burdens associated with cross-party collaboration, software technology has been developed to facilitate electronic collaboration between multiple parties. In particular, Procore Technologies, Inc., who is the assignee of the present application, has been developing new software technology for facilitating ingestion, storage, and accessibility of project data, determining intelligent connectivity between project data, and deriving meaningful insights from project data, as well as new frameworks and software tools for improved cross-party collaboration.

For example, Procore Technologies has developed new software technology that includes an improved data management and cross-party collaboration model that provides collaborators with their own user accounts and more flexible data access and data retention permissions with respect to construction project data. More information about these improvements can be found in U.S. application Ser. No. 17/191,484, filed on Mar. 3, 2021, and titled "Computer System and Methods for Managing Data, Data Access, and Data Retention," which is incorporated by reference herein in its entirety.

As another example, Procore Technologies has developed new software technology that utilizes machine-learning models to ingest data that is generated throughout different phases of a construction project and associate that data with physical locations within the construction project. Based on these associations, relationships between data objects can be established and used to create a construction knowledge graph that reflects the connectivity between the various different types of data objects associated with a construction project. More information about these improvements can be found in U.S. application Ser. No. 17/307,869, filed on May 4, 2021, and titled "Construction Knowledge Graph," which is incorporated by reference herein in its entirety.

As yet another example, Procore Technologies has developed new software technology that utilizes machine-learning models to identify discrete physical locations of a construction project, determine interrelationships between those physical locations and other data associated with the construction project, and generate a hierarchical data taxonomy that presents those location entities and their interrelationships in a visual depiction based on which the location entities and their interrelationships can be easily identified. More information about these improvements can be found in U.S. application Ser. No. 17/957,501, filed on Sep. 30, 2022, and titled "Computer Systems and Methods for Identifying Location Entities and Generating a Location Entity Data Taxonomy," which is incorporated by reference herein in its entirety.

Procore Technologies has continued to build upon these innovations by exploring improvements related to collaborative processes and data connectivity. For instance, Procore Technologies has developed new software technology that facilitates enhanced collaborative processes by improving data compatibility among parties collaborating on a construction project, while also providing collaborators with flexibility to customize project data according to their own respective preferences. More information about these improvements can be found in U.S. application Ser. No. 18/193,627, filed on Mar. 30, 2023, and titled "Connected Configurations Across Collaborator Accounts," which is incorporated by reference herein in its entirety.

Nonetheless, existing technology for facilitating collaboration and data connectivity does not address certain challenges related to managing user access to construction project data. For instance, existing approaches for defining permissions typically employ user access level-based permissions and/or role-based permissions, which involve assigning individual users with a certain level of access (e.g., administrator-level, standard-level, etc.) that has a set of associated permissions or assigning individual users with a certain role that has a set of associated permissions. However, these approaches are not ideal for various reasons.

As one example, it is not always apparent which permissions are included with a given level or a given role. For instance, the scope of permissions that are associated with a "Standard" permission level or an "Employee" role may not be transparent, either to a user that is setting permissions or to a user that has been assigned permissions. As another example, permissions for users (e.g., user accounts) must typically be configured individually—that is, each user's permission settings that define the scope of their access to data and the actions they can perform with respect to the data must be individually configured—which can be a cumbersome and time-consuming process, especially given the vast number of construction professionals that are typically involved in a construction project and need to access project data. Moreover, blanket sets of permissions according to some existing approaches lack flexibility and may not give a user the type of access needed to complete certain tasks. For instance, blanket approaches do not enable configuration of different types of permissions for users with respect to different types of data, making it difficult or impossible to grant users different permissions to complete different tasks.

To illustrate with an example, a Subcontractor ("SC") may not want to give a Vendor permissions to edit data objects that fall outside the Vendor's scope of work, such as project specification documents or project drawings. Thus, the SC may configure the Vendor's permissions to allow read-only access. However, it would be beneficial and likely necessary to give the Vendor certain types of access to certain types of data objects that facilitate the Vendor's work. For instance, the Vendor may need to create, review, edit, or forward RFI data objects in order to complete their project tasks. Further, the Vendor may need to create or edit timesheet data objects in order to track and bill the time spent working on their project tasks. However, existing approaches for configuring permissions either fail to provide a mechanism for customizing the Vendor's permissions to allow certain types of access/permissions for certain data under certain circumstances, or require tedious management of specific permissions for each different user to accomplish this level of control.

In some instances, it may be possible to create a custom permissions template that may be applied to a given user. However, this typically requires creation of a respective template for each different combination of permissions, and such templates may need to be created for and/or assigned individually to each user that requires those permissions, which can be cumbersome. Further, under existing approaches, only a single permissions template can be assigned to a user at any time, which may require a given user's permissions to be changed each time the user needs a different type of access, which is not only cumbersome, but can also lead to reduced data security if the given user's permissions are not properly constrained.

Further yet, existing approaches do not enable customized configuration of permissions on a granular level. Under the existing approaches, user permissions are typically defined by fixed permissions categories that provide different types of access to data (e.g., view, edit, create, delete, etc.), and there is little or no opportunity for further defining access within those categories more granularly. Further yet, existing approaches define permissions based on user attributes (e.g., a role associated with a user, an access level associated with a user, etc.). These approaches fail to consider that a user's access to certain types of data may need to change based on certain circumstances. For instance, continuing the example above, if the Vendor has submitted an RFI to the SC requesting additional information required to complete a particular project task, it may be desirable to restrict the Vendor's access to the RFI until the SC has finished reviewing and responding to the RFI to avoid miscommunication or inaccurate/incomplete exchange of information. However, current approaches do not provide a mechanism to configure permissions in a manner that respects data object attributes such that access to certain types of data objects for certain users is regulated based on whether or not the certain types of data objects have attributes that satisfy certain conditions (e.g., the Vendor can view and/or edit the RFI only if the RFI is currently assigned to the Vendor).

To address these and other shortcomings, disclosed herein is new software technology that is directed to a new permissions framework that involves permissions groups that dictate access to data objects within one or more data domains based on group membership and data object attributes. In a first aspect, at a high level, the disclosed technology enables configuration of permissions groups for a construction project, each permissions group indicating (i) one or more data domains of the construction project, (ii) one or more members of the permissions group, (iii) a set of one or more actions that can be performed by members of the permissions group on data objects that satisfy a set of data object attribute conditions, and (iv) the set of data object attribute conditions that must be satisfied by data objects within a given data domain in order to enable performance of the set of action(s) on the data objects by members of the permissions group. In a second aspect, at a high level, the disclosed technology enables managing access to data for a construction project based on configured permissions groups for the construction project.

Accordingly, disclosed herein is a method carried out by a computing platform that involves (i) receive configuration data defining a permissions group for a construction project, the configuration data indicating a data domain of the construction project and a set of actions that are permitted to be performed on data objects within the data domain that satisfy a condition comprising a particular value for a particular data object attribute, (ii) after receiving the configuration data defining the permissions group, receive a data access request, on behalf of a user account, for a given data object within the data domain, (iii) determine that the user account is a member of the permissions group, (iv) determine that the given data object within the data domain comprises the particular data object attribute having the particular value and thereby satisfies the condition, (v) based on determining that (a) the user account is a member of the permissions group and (b) the given data object satisfies the condition, determine that the user account is permitted to perform the set of actions on the given data object, and (vi) cause an end-user device associated with the user account to enable performance of the set of actions on the given data object by the user account.

Further, disclosed herein is a computing platform comprising at least one network interface, at least one processor, at least one non-transitory computer-readable medium, and program instructions stored on the at least one non-transitory computer-readable medium that are executable by the at least one processors such that the computing platform is configured to carry out the functions disclosed herein, including but not limited to the functions of the foregoing methods.

Further yet, disclosed herein is at least one non-transitory computer-readable storage medium that is provisioned with program instructions that, when executed by at least one processor, cause a computing platform to carry out the functions disclosed herein, including but not limited to the functions of the foregoing methods.

One of ordinary skill in the art will appreciate these as well as numerous other aspects in reading the following disclosure. Further, while the following disclosure is described with reference to construction projects and construction project data, it should be understood that the disclosed technology can be implemented in a variety of other practice areas.

BRIEF DESCRIPTION OF THE DRAWINGS

FIG. 4 depicts an example user interface view that includes example attributes that may be available for selection when configuring a permissions group for a construction project in accordance with aspects of the disclosed technology.

FIG. 5A depicts one example of a user interface view that may be provided for configuring a permissions group in accordance with aspects of the disclosed technology.

FIG. 5B depicts another example of a user interface view that may be provided for configuring a permissions group in accordance with aspects of the disclosed technology.

FIG. 6A depicts yet another example of a user interface view that may be provided for configuring a permissions group in accordance with aspects of the disclosed technology.

FIG. 6B depicts a further example of a user interface view that may be provided for configuring a permissions group in accordance with aspects of the disclosed technology.

FIG. 8 depicts an example computing environment in which example embodiments in accordance with aspects of the disclosed technology may be implemented.

FIG. 9 depicts a flowchart of an example process that may be carried out for configuring a permissions group for a construction project in accordance with aspects of the disclosed technology.

Figure 1:
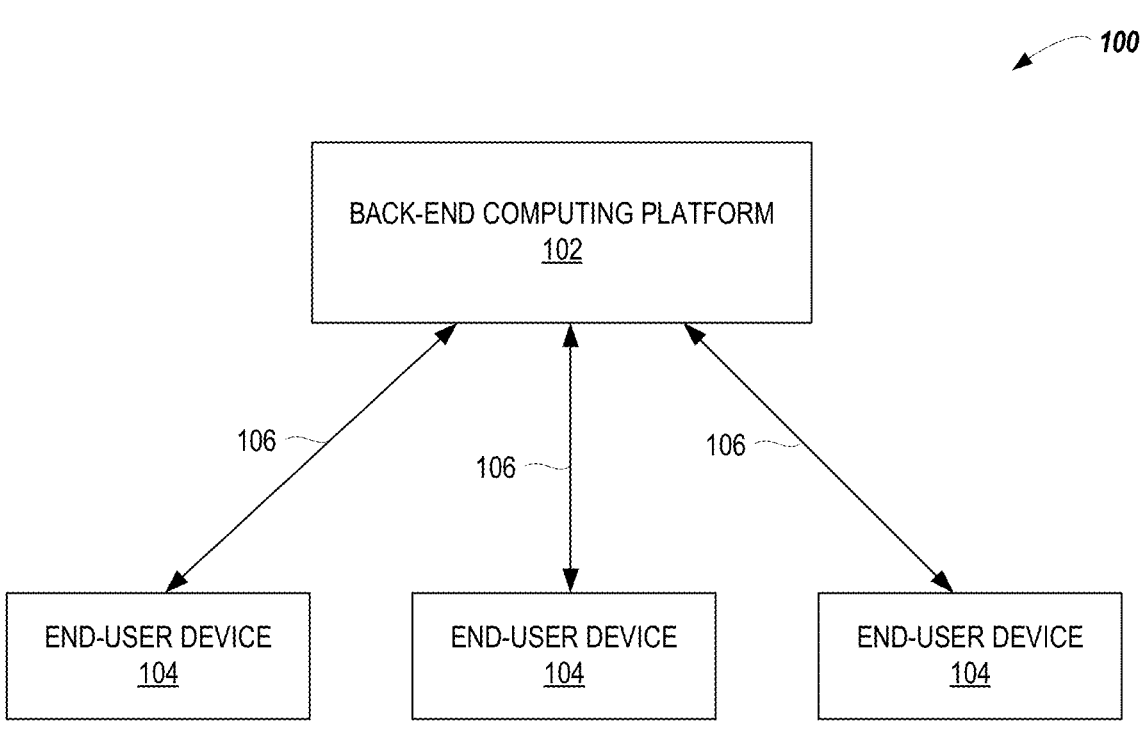
FIG. 1 depicts an example computing environment in which example embodiments disclosed herein may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

In practice, as one possible implementation, the disclosed software technology may be provided to customers via a construction management software application in the form of a software as a service ("SaaS") and may include both front-end software running on one or more end-user devices that are accessible to users of the software technology and back-end software running on a back-end computing platform (sometimes referred to as a "cloud" platform or a "data" platform) that interacts with and/or drives the front-end software, and which may be operated (either directly or indirectly) by a provider of the front-end client software (e.g., Procore Technologies, Inc.). As another possible implementation, the disclosed software technology may include front-end client software that runs on end-user devices without interaction with a back-end platform (e.g., a native software application, a mobile application, etc.). The software technology disclosed herein may take other forms as well.

I. EXAMPLE COMPUTING ENVIRONMENT

Turning now to the figures, FIG. 1 depicts an example computing environment 100 in which example embodiments of the present disclosure may be implemented. As shown in FIG. 1, the computing environment 100 includes an example back-end computing platform 102 that may be communicatively coupled to one or more end-user devices, depicted here, for the sake of discussion, as three end-user devices 104.

In practice, the back-end computing platform 102 may generally comprise some set of physical computing resources (e.g., processors, data storage, communication interfaces, etc.) that are utilized to implement the new software technology discussed herein. This set of physical computing resources may take any of various forms. As one possibility, the back-end computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the back-end computing platform 102 may comprise "on-premises" computing resources of the organization that operates the back-end computing platform 102 (e.g., organization-owned servers). As yet another possibility, the back-end computing platform 102 may comprise a combination of cloud computing resources and on-premises computing resources.

Further, as yet another possibility, the back-end computing platform 102 may comprise one or more dedicated servers that have been provisioned with software for carrying out one or more of the computing platform functions disclosed herein, including but not limited to functions related to enabling configuration of permissions groups and managing access to data based on permissions groups. The one or more computing systems of the back-end computing platform 102 may take various other forms and be arranged in various other manners as well.

In turn, the end-user devices 104 may take any of various forms, examples of which may include a desktop computer, a laptop, a netbook, a tablet, a smartphone, and/or a personal digital assistant (PDA), among other possibilities.

As further depicted in FIG. 1, the back-end computing platform 102 may be configured to communicate with the end-user devices 104 over respective communication paths 106. Each communication path 106 between the back-end computing platform 102 and an end-user device 104 may generally comprise one or more communication networks and/or communications links, which may take any of various forms. For instance, each respective communication path 106 with the back-end computing platform 102 may comprise any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 106 with the back-end computing platform 102 may be wireless, wired, or some combination thereof, and may carry data according to any of various different communication protocols. Although not shown, the respective communication paths 106 with the back-end computing platform 102 may also include one or more intermediate systems. For example, it is possible that the back-end computing platform 102 may communicate with a given end-user device 104 via one or more intermediary systems, such as a host server (not shown). Many other configurations are also possible.

Although not shown in FIG. 1, the back-end computing platform 102 may also be configured to receive data from one or more external data sources that may be used to facilitate functions related to the processes disclosed herein. For example, the back-end computing platform 102 may be configured to receive permissions group configuration data from external data sources.

It should be understood that the computing environment 100 is one example of a computing environment in which embodiments described herein may be implemented. Numerous other arrangements are possible and contemplated herein. For instance, other computing environments may include additional components not pictured and/or more or less of the pictured components.

II. EXAMPLE COMPUTING PLATFORM

Figure 2:
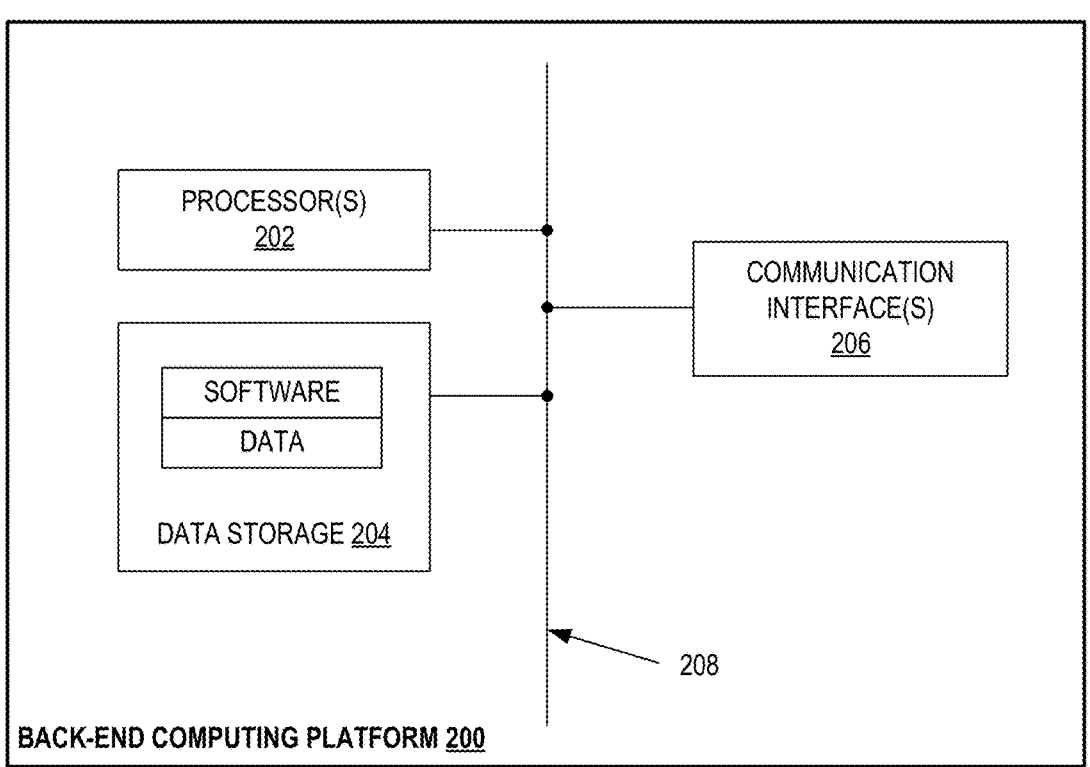
FIG. 2 depicts a structural diagram of an example computing platform that may be configured to carry out one or more functions in accordance with the disclosed technology.

FIG. 2 is a simplified block diagram illustrating some structural components that may be included in an example back-end computing platform 200. The example back-end computing platform 200 could serve as, for instance, the back-end computing platform 102 of FIG. 1 that may be configured to create and/or run the disclosed software technology. In line with the discussion above, the back-end computing platform 200 may generally comprise one or more computer systems (e.g., one or more servers), and these one or more computer systems may collectively include at least one or more processors 202, data storage 204, and one or more communication interfaces 206, all of which may be communicatively linked by a communication link 208 that may take the form of a system bus, a communication network such as a public, private, or hybrid cloud, or some other connection mechanism.

The one or more processors 202 may comprise one or more processor components, such as general-purpose processors (e.g., one or more single- or multi-core microprocessors), special-purpose processors (e.g., one or more application-specific integrated circuits or digital-signal processors), programmable logic devices (e.g., one or more field programmable gate arrays), controllers (e.g., one or more microcontrollers), and/or any other processor components now known or later developed. In line with the discussion above, it should also be understood that the one or more processors 202 could comprise processing components that are distributed across a plurality of physical computing resources connected via a network, such as a computing cluster of a public, private, or hybrid cloud.

In turn, the data storage 204 may comprise one or more non-transitory computer-readable storage mediums that are collectively configured to store (i) program instructions that are executable by the one or more processors 202 such that the computing platform 200 is configured to perform some or all of the functions disclosed herein and (ii) data that may be received, derived, or otherwise stored, for example, in one or more databases, file systems, or the like, by the computing platform 200 in connection with the disclosed functions. In this respect, the one or more non-transitory computer-readable storage mediums of the data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 204 may comprise computer-readable storage mediums that are distributed across a plurality of physical computing resources connected via a network, such as a storage cluster of a public, private, or hybrid cloud. Data storage 204 may take other forms and/or store data in other manners as well.

The one or more communication interfaces 206 may be configured to facilitate wireless and/or wired communication with external data sources and/or end-user devices, such as the end-user devices 104 in FIG. 1. Additionally, in an implementation where the back-end computing platform 200 comprises a plurality of physical computing resources connected via a network, the one or more communication interfaces 206 may be configured to facilitate wireless and/or wired communication between those physical computing resources (e.g., between computing and storage clusters in a cloud network). As such, the one or more communication interfaces 206 may take any suitable form for carrying out these functions, examples of which may include an Ethernet interface, a serial bus interface (e.g., Firewire, USB 3.0, etc.), a chipset and antenna adapted to facilitate wireless communication and/or any other interface that provides for wireless communication (e.g., Wi-Fi communication, cellular communication, short-range wireless protocols, etc.) and/or wired communication, among other possibilities. The one or more communication interfaces 206 may also include multiple communication interfaces of different types. Other configurations are possible as well.

Although not shown in FIG. 2, the back-end computing platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the back-end computing platform 200.

It should be understood that the back-end computing platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE END-USER DEVICE

Figure 3:
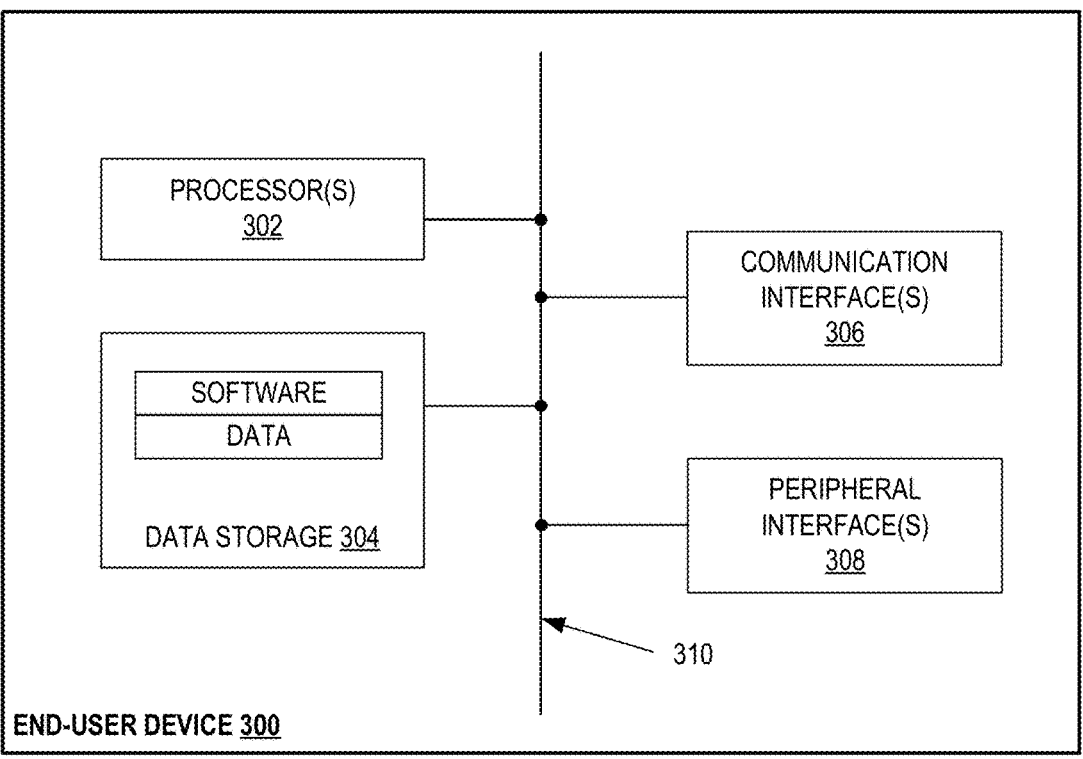
FIG. 3 depicts a structural diagram of an example end-user device that may be configured to communicate with the example computing platform of FIG. 2 and also carry out one or more functions in accordance with aspects of the disclosed technology.

Turning now to FIG. 3, a simplified block diagram is provided to illustrate some structural components that may be included in an example end-user device 300, such as an end-user device 104 described above with reference to FIG. 1. As shown in FIG. 3, the end-user device 300 may include one or more processors 302, data storage 304, one or more communication interfaces 306, and one or more peripheral interfaces 308, all of which may be communicatively linked by a communication link 310 that may take the form of a system bus or some other connection mechanism. Each of these components may take various forms.

The one or more processors 302 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

The data storage 304 may comprise one or more non-transitory computer-readable storage mediums that are collectively configured to store (i) program instructions that are executable by the processor(s) 302 such that the end-user device 300 is configured to perform certain functions related to interacting with and accessing services provided by a computing platform, such as the example back-end computing platform 200 described above with reference to FIG. 2, and (ii) data that may be received, derived, or otherwise stored, for example, in one or more databases, file systems, repositories, or the like, by the end-user device 300, related to interacting with and accessing the services provided by the computing platform. In this respect, the one or more non-transitory computer-readable storage mediums of the data storage 304 may take various forms, examples of which may include volatile storage mediums such as random-access memory, registers, cache, etc., and non-volatile storage mediums such as read-only memory, a hard-disk drive, a solid-state drive, flash memory, an optical-storage device etc. The data storage 304 may take other forms and/or store data in other manners as well.

The one or more communication interfaces 306 may be configured to facilitate wireless and/or wired communication with other computing devices. The one or more communication interfaces 306 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 300 may additionally include or have one or more peripheral interfaces for connecting to one or more electronic peripherals that facilitate user interaction with the end-user device 300, such as a keyboard, a mouse, a trackpad, a display screen, a touch-sensitive interface, a stylus, a virtual-reality headset, and/or one or more speaker components, among other possibilities.

It should be understood that the end-user device 300 is one example of an end-user device that may be used to interact with a computing platform as described herein.

Numerous other arrangements are possible and contemplated herein. For instance, in other embodiments, the end-user device 300 may include additional components not pictured and/or more or fewer of the pictured components.

IV. EXAMPLE PERMISSIONS FRAMEWORK

As described above, Procore Technologies has continued to build on its previous innovations related to improved collaboration models and techniques for managing data and data access. Disclosed herein is new software technology that provides a new permissions framework and new techniques for managing user access to construction project data. At a high level, the disclosed technology involves permissions groups that dictate access to data objects within one or more data domains of a construction project based on group membership and data object attributes.

In a first aspect, at a high level, the disclosed technology enables configuration of permissions groups for a construction project, each permissions group indicating (i) at least one data domain of the construction project, (ii) one or more members of the permissions group, (iii) a set of one or more actions that can be performed by members of the permissions group on data objects that satisfy a set of data object attribute conditions, and (iv) the set of data object attribute conditions that must satisfied by data objects within a given data domain in order to enable performance of the set of action(s) on the data objects by members of the permissions group. In a second aspect, at a high level, the disclosed technology enables managing access to data for a construction project based on configured permissions groups for the construction project.

In general, access to construction project data is facilitated by means of user accounts associated with a software application, such as a software application incorporating the software technology disclosed herein. In this respect, each party that is involved in a construction project may have (or may register for) a user account for a software application that incorporates the disclosed software technology, such as the construction management software application provided by Procore Technologies. For instance, each project owner, general contractor, subcontractor, vendor, and construction professional involved with a construction project may have a respective user account via which they can manage their respective responsibilities for the construction project and perform various actions, such as accessing, creating, editing, or sharing project data for the construction project, and communicating and coordinating with other parties to complete work for the construction project, among other possibilities.

In general, the various parties involved in a construction project typically involve a hierarchy of contractual relationships between a project owner, one or more general contractors, numerous subcontractors, vendors, suppliers, and the like. Within this hierarchy, the project owner is typically responsible for financing the construction project and typically hires a general contractor. The general contractor is typically responsible for managing the construction project, maintaining a schedule and budget for the construction project, and hiring and overseeing subcontractors to complete work for the construction project. Each subcontractor is typically responsible for completing one or more specific project tasks (e.g., procuring and/or installing materials, performing work, etc.), which may involve managing their own internal work crews and/or hiring additional sub-subcontractors, vendors, suppliers, etc. to assist them with performing the one or more particular project tasks, providing necessary materials, and so on. Within this hierarchy, a project owner or a general contractor may be referred to herein as a "prime" party that has a higher level of responsibility and control over the construction project, while all other parties that exchange data with each other and/or with the prime party may be referred to herein as a "collaborator" party, or simply a "collaborator" for the purposes of the discussion below. Successfully completing a construction project often requires collaborators to communicate, coordinate, and share/exchange various construction project data (e.g., one or more data objects) with each other to complete project-related tasks.

As mentioned above, it may be beneficial and desirable for different parties (e.g., prime party, collaborators) to have different permissions for different types of data objects under different conditions. In accordance with the disclosed technology, data objects associated with a construction project may be categorized into various types, each of which may be referred to herein as a respective "data domain" or simply a "domain." Further, each type of data object within a given domain may have a particular set of data object attributes that can be used to describe the type of data object. The data object attributes may correspond to data fields associated with the given type of data object. Further, each data object attribute may have a variety of possible attribute values. The particular attribute values for a given data object collectively define the data for the given data object. Certain attributes may be configured to require a value in order to create a new data object, whereas others may be optional. In any event, the set of attributes for a given type of data object within a given data domain may be a standard set of attributes for all data objects of the given type. However, the particular values for the data object attributes may be unique to each data object.

The data domains of a construction project and their respective types of data objects, data object attributes, and possible attribute values may take various forms.

As one example, a "Timesheet" domain may comprise all "timesheet" and timesheet-related data objects for a construction project, and each timesheet may have a set of attributes that can be used to describe the timesheet. For instance, the timesheet attributes may include a date, a start time, an end time, a construction professional to whom the timesheet pertains, a supervisor of the construction professional, or a project name, among other possibilities. In line with the discussion above, the particular values for each timesheet may be unique to the timesheet depending on when the timesheet was created, when the work depicted in the timesheet was performed, the particular construction professional to whom the timesheet pertains, the construction professional's supervisor, or the particular construction project for which the timesheet was created.

As another example, an "RFI" domain may comprise all "RFI" and RFI-related data objects for a construction project, and all RFIs may have a set of RFI attributes that can be used to describe various aspects of the RFIs. FIG. 4 depicts an example user interface view 400 that includes example attributes that may be available for describing RFI data objects within an RFI domain. For instance, as shown in FIG. 4, the RFI attributes may include a variety of attributes, such as an RFI number, a subject, a due date, a current assignee, a relevant location, the information that is to be requested, or related attachments, among others. Certain attributes may require a value to be provided in order to create a new RFI, as indicated by an accompanying asterisk, whereas other attributes may be left blank. In line with the discussion above, the particular values for a given RFI may be unique to the given RFI.

The various domains of a construction project may take a variety of other forms, such as an "Invoice" domain that comprises all invoices and invoice-related data objects for the construction project, a "Budget" domain that comprises budgets and budget-related data objects for the construction project, a "Document Management" domain that comprises document data objects for the construction project, a "Photos" domain that comprises image data objects for the construction project, or a "Change Orders" domain that comprises change order objects for the construction project, among other possibilities.

In accordance with the disclosed technology, data object attributes of data objects within various data domains of a construction project may be leveraged to configure customized permissions groups that each indicate (i) one or more members of the permissions group (e.g., user accounts associated with the permissions group) that are permitted to perform actions on data objects within a given domain, (ii) a set of one or more actions that may be performed by the members of the permissions group, and (iii) a set of data attribute conditions that must be satisfied in order to enable performance of the set of action(s) by the members of the permissions group. In this respect, the disclosed technology may include a user interface comprising one or more interface views that enable a user (e.g., an employee of a GC or SC who is tasked with configuring permissions) to configure permissions groups for data domains of a construction project. For instance, the user may access a software application that incorporates the disclosed technology and navigate to a software tool of the application that enables configuration of permissions groups. The user may then configure a new permissions group (or modify an existing permissions group) by inputting data defining the permissions group.

The data defining a permissions group for a construction project may take various forms.

As one example, the data defining the permissions group may include an identifier for the permissions group. For instance, the identifier may take the form of a textual description, a numerical identifier, or a combination thereof. As another example, the data defining the permissions group may indicate one or more data domains of the construction project. In this respect, a permissions group may be domain-specific and apply permissions to data objects from a specific domain, or a permissions group may encompass multiple domains (e.g., a permissions groups that governs both an "RFI" domain and a "Change Orders" domain). As yet another example, the data defining the permissions group may indicate a set of one or more actions that may be performed on data objects within the one or more data domains. As a further example, the data defining the permissions group may include a set of one or more data object attribute conditions that must be satisfied in order for the set of action(s) to be enabled. In this respect, each data object attribute condition may comprise an attribute-value pair that indicates (i) a given data object attribute and (ii) one or more corresponding attribute values that may satisfy the data object attribute condition. For instance, to illustrate with an example, a given permissions group governing RFI data objects may comprise a data attribute condition that indicates that (i) a user (e.g., user account) indicated as an assignee of a given RFI (ii) must match the user (e.g., user account) requesting access to the given RFI in order for a respective set of actions indicated by the given permissions group to be enabled for performance on the given RFI. As another example, the data defining the permissions group may indicate one or more group members (e.g., user accounts) that are permitted to perform an indicated set of action(s) if an indicated set of data object attribute(s) is satisfied.

The user interface views that may be presented to a user to enable configuration of a permissions group may take various forms.

FIG. 5A depicts one example of an interface view 500 that includes permissions group configuration options that may enable a user to provide one or more user inputs collectively configuring a permissions group 502 for a given construction project in line with the discussion above.

As shown in FIG. 5A, the permissions group 502 comprises an identifier "Team A Foreman," indicating that the permissions group 502 is to be implemented to regulate data access for any construction professional identified as a foreman of a given construction crew designated as "Team A."

Further, a domain 504 indicates that the permissions group 502 is to be implemented with respect to timesheet data objects within a Timesheet domain of the given construction project. In general, the given domain (or domains) for a permissions group of a construction project may be indicated in various ways. For instance, as one possibility, the interface view may include a set of selectable domain options (e.g., a drop down menu, a radio button list, a drag-and-drop option, etc.) corresponding to domains of the construction project from which a given domain (or domains) for the permissions group may be selected. As another possibility, the interface may include a text input field and/or a search field through which the user may input and select a given domain. In the example shown in FIG. 5A, the selection of the domain 504 comprises a checkbox selection.

Further yet, a set of one or more actions 506 indicates what actions may be performed on timesheet data objects that satisfy certain conditions. In general, the set of actions that is to be presented to a user for configuring a permissions group may be determined in various ways. For instance, as one possibility, the set of actions may comprise a predefined set of actions associated with an identified data domain. As another possibility, the set of actions may comprise all actions that may be performed by collaborators on data objects of the given construction project. Other examples are also possible. Further, the manner in which the set of actions is presented to the user may take various forms, such as a drop-down menu, a drag-and-drop feature, or a checkbox list, among other possibilities. In any event, the set of actions may be presented in a manner which enables selection of one or more actions for the permissions group. In the example of FIG. 5A, the options for configuring the set of action(s) 506 are each presented in the form of a selectable checkbox option, and the user has selected a particular action to be included in the set 506, as indicated by the checkmark selection accompanying the particular action.

Furthermore, as shown in FIG. 5A, the permissions group 502 indicates a set of conditions 508 that must be satisfied in order for the set of actions 506 to be enabled for performance on data objects within the Timesheets domain (e.g., timesheet data objects). In line with the discussion above, each condition comprises an attribute-value pair. The attribute options that are presented to the user for selecting a given attribute may be determined in various ways. For instance, the attribute options may be determined based on a set of attributes associated with data objects within the given domain (or domains) identified for the permissions group, where each attribute may be presented as a selectable option to serve as the attribute for a given attribute-value pair. The attribute options may be determined in other ways as well.

Further, the value options that may be presented for selecting one or more values for a given attribute-value pair may be determined in various ways. As one possibility, the value options presented for a given attribute may be determined based on the given attribute and the type of values that may correspond to the given attribute. For example, if the given attribute indicates a user identification attribute, then the corresponding value options may include one or more user accounts that can be added as acceptable values for the attribute. As another possibility, the interface view may include an option to enter one or more values for the selected attribute, such as via a textbox. Other examples are also possible. In the example of FIG. 5A, the set of conditions 508 includes a single attribute-value pair. As shown, the user has selected a "Created By" attribute and three corresponding acceptable values each indicating a given user account, indicating that the set of actions 506 defined by the permissions group 502 may be performed on timesheets that have been created by one of the given user accounts.

Further still, the permissions group 502 indicates a set of one or more members 510, indicating that any user accounts included in the set of members 510 are permitted to perform any of the actions indicated in the action set 506 on timesheets that satisfy the condition set 508. The one or more members may be added to the set of members 510 in any of various ways. For instance, as one possibility, the view 500 may enable the user to drag-and-drop representations of user accounts into a pane indicating the set of members 510. As another example, the view 500 may enable the user to search for and/or select users accounts to be included in the set of members 510. Other examples are also possible.

The view 500 further includes selectable options to either "Cancel" the current configuration, or "Save" the configuration for the permissions group 502 and thereby cause data defining the permissions group 502 to be stored in accordance with the configuration settings shown in FIG. 5A.

In line with the discussion above, the permissions group 502 indicates (i) which user accounts are permitted to perform (ii) what actions (ii) on which data objects (iv) under what conditions. For instance, the permissions group 502 indicates that (i) Foreman Bob is permitted to (ii) update a status of (iii) any timesheet (iv) that was created by either User 1, User 2, or User 3.

FIG. 5B depicts another example of an interface view 520 that includes permissions group configuration options that may enable a user to provide one or more user inputs collectively configuring a permissions group 522 for a given construction project in line with the discussion above. In the example of FIG. 5B, the permissions group 522 is titled "Field Team 4" and is to govern data objects within a "Document Management" domain 524 of the given construction project. Further, an action set 526 includes a set of actions that may be performed by members of the permissions group 522. As shown, the user has selected three actions that may be performed by members of the permissions group 522 if certain attribute conditions indicated in the attribute condition set 528 are met. In the example of FIG. 5B, the user has selected two attributes and respective values for inclusion in the attribute condition set 528. As shown, a first "Status" attribute has two corresponding acceptable values, and a second "Type" attribute that has three corresponding acceptable values, indicating that the permissions group 522 will govern any document data objects that have both (i) a "Status" attribute having a value that matches either one of the two corresponding acceptable values and (ii) a "Type" attribute having a value that matches any one of the three corresponding acceptable values. Further, the permissions group 522 indicates a set of one or more members 530 that includes three user accounts that are permitted to perform any of the actions indicated in the action set 526 on any document data objects that satisfy the condition set 528.

The view 520 further includes selectable options to either "Cancel" the configuration, or "Save" the configuration for the permissions group 522 and thereby cause data defining the permissions group 522 in accordance with the configuration settings shown in FIG. 5B to be stored.

In line with the discussion above, the permissions group 522 indicates (i) which user accounts are permitted to perform (ii) what actions (iii) on which data objects (iv) under what conditions. For instance, the permissions group 522 indicates that (i) Team Member A, Team Member B, and Team Member C are each permitted to (ii) download, view, and view markup on (iii) any documents (iv) that (a) have been approved or approved with changes and (b) are categorized as either drawings, models, or specifications.

It should be understood that the permissions group configurations depicted in FIGS. 5A and 5B are representative examples of permissions group configurations. Many other configurations are possible in accordance with the disclosed technology. For instance, a permissions group configuration may indicate any number of data domains, any number of permissible actions, any number of attributes with any number of corresponding acceptable values, and any number of members.

Further, the disclosed technology enables members to be added to multiple permissions groups. In some instances, it is possible that a given user's access to a given data object may be governed by more than one permissions group with different sets of permissible actions. In such instances, as one possibility, different sets of permissible actions may be resolved by assessing the broadest set of permissible actions, in the aggregate. For example, with reference to FIG. 5A, Foreman Bob may also serve as foreman for Team B that includes a given team member, User 1, from Team A. Thus, Foreman Bob may also be added as a member to a second permissions groups that governs timesheets created by members of Team B (e.g., a Team B Foreman group). However, the second Team B Foreman permissions group may indicate all three actions shown in the action set 506 as permissible actions that may be performed by group members, with a similar condition set that permits those actions on timesheets created by the members of Team B, including User 1. Thus, with respect to timesheets created by User 1, the actions that Foreman Bob may be permitted to perform are governed by two different group memberships. As noted above, Foreman Bob may have permission to perform the broadest set of actions in accordance with the second Team B Foreman permissions group. In this regard, permissions within the framework discussed herein are additive, rather than subtractive. In other words, a user's permissions with respect to a given data object are defined by the sum of all permissions that apply to the given data object, across all groups in which the user is a member. Other examples are also possible.

Advantageously, the disclosed framework for configuring permissions groups that govern access to data objects of a construction project facilitates customization at a granular level with respect to permitted actions on data objects that meet certain attribute conditions. Further, the disclosed framework for configuring permissions groups enables users to be added to multiple permissions groups, thus enabling more than one set of permissions to be associated with a given user for different types of data objects and different conditions. Further still, the disclosed framework for configuring permissions groups enables access to data objects to be automatically and dynamically updated based on attribute values of the data objects. This feature may be particularly useful for regulating access to data objects that may have attributes with values that are expected to change.

To illustrate with a practical example, a Vendor that is tasked with installing drywall at a construction site may need additional information to complete the task. Thus, the Vendor may begin a new RFI workflow by creating an RFI to request the additional information and submitting the RFI to a Subcontractor. It is possible that the Subcontractor may not have all of the requested information, in which case it may forward the RFI to a General Contractor, who may provide (at least some of) the requested information and return the RFI to the Subcontractor. The Subcontractor may then send the RFI back to the Vendor, perhaps after making further updates. As the RFI progresses through the workflow, the respective value of one or more attributes of the RFI may change to reflect updated information. For instance, a status of the RFI (e.g., open, submitted, forwarded, etc.) or an assignee of the RFI (e.g., Vendor, Subcontractor, General Contractor, etc.) may change from one stage of the workflow to the next. In such instances, it may be desirable to modify access to the RFI by one or more parties during different stages of the workflow. For example, when the Vendor is creating the RFI, it may be desirable for the Vendor to be able to view, download, edit, forward, or submit the RFI. However, after the Vendor has submitted the RFI to the Subcontractor, it may be desirable to limit the Vendor's access to the RFI such that the Vendor is not able to edit any attributes of the RFI and is able only to view the RFI, thus preventing any interference with the Subcontractor's (or the General Contractor's) review of the RFI.

FIGS. 6A and 6B depict example interface views of permissions group configuration options that may enable a user to configure permissions groups that may be used to regulate access to RFIs depending on respective values of one or more attributes of the RFIs in scenarios such as those described in the example above.

With reference first to FIG. 6A, a permissions group 602 titled "RFI Controllers" indicates an RFI domain 604, an action set 606, an attribute condition set 608, and a member set 610. In line with the discussion above, the permissions group 602 indicates (i) which user accounts are permitted to perform (ii) what actions (iii) on which data objects (iv) under what conditions. For instance, as shown in FIG. 6A, the permissions group 602 indicates that (i) respective user accounts for Vendor, Subcontractor, and General Contractor are each permitted to (ii) view, download edit, forward, submit, or mark as complete (iii) any RFIs (iv) that are (a) in a workflow and (b) assigned to themselves. The view 600 further includes selectable options to either "Cancel" the configuration, or "Save" the configuration for the permissions group 602 and thereby cause data defining the permissions group 602 in accordance with the configuration settings shown in FIG. 6A to be stored.

Turning now to FIG. 6B, a permissions group 622 titled "RFI Bystanders" indicates an RFI domain 624, an action set 626, an attribute condition set 628, and a member set 630. In line with the discussion above, the permissions group 622 indicates that (i) respective user accounts for Vendor, Subcontractor, and General Contractor are each permitted to (ii) view (iii) RFIs (iv) that are (a) in a workflow and (b) not assigned to themselves. The view 620 further includes selectable options to either "Cancel" the configuration, or "Save" the configuration for the permissions group 622 and thereby cause data defining the permissions group 622 in accordance with the configuration settings shown in FIG. 6B to be stored.

As described above, the permissions groups 602 and 622 may be used to govern access to RFI data objects within an RFI domain of a construction project based on the workflow status and the current assignee of the RFIs. In this way, the disclosed permissions framework enables access to be regulated based on data object attribute values. In some implementations, it is possible that only one of the permissions groups 602 or 622 may be configured. For instance, only the permissions group 602 may be configured. In such implementations, it may be the case that a member of the permissions group 602 has no access to view RFIs that do not satisfy the condition set 608, such as RFIs that are in a workflow but not assigned to the member (given that the member is not part of a different permissions group that would grant the member with permissions to view such RFIs). Other variations are also possible.

Further, it should be understood that the configuration options shown in FIGS. 6A and 6B depict two representative examples of permissions group configurations for an RFI domain. Many other configurations are possible. For example, in other implementations, the action set from which one or more permissible actions may be selected may include other actions not shown in FIGS. 6A and 6B, such as creating a draft RFI, opening a draft RFI, or setting a cost impact for an RFI. As another example, in other implementations, the condition set indicating one or more attribute-value pairs may include other attributes and/or values not shown in FIGS. 6A and 6B. Many other examples are possible.

Still further, although the examples shown in FIGS. 5A-6B depict example permissions groups that each correspond to a single domain, it is also possible that a permissions group may configure permissions across multiple domains, as noted above. For example, a single permissions group might include the features shown in both FIG. 5A and FIG. 6A, and thus the permissions groups may configure permissions for both the Timesheets domain as well as the RFI domain. Other examples are also possible.

Figure 7:
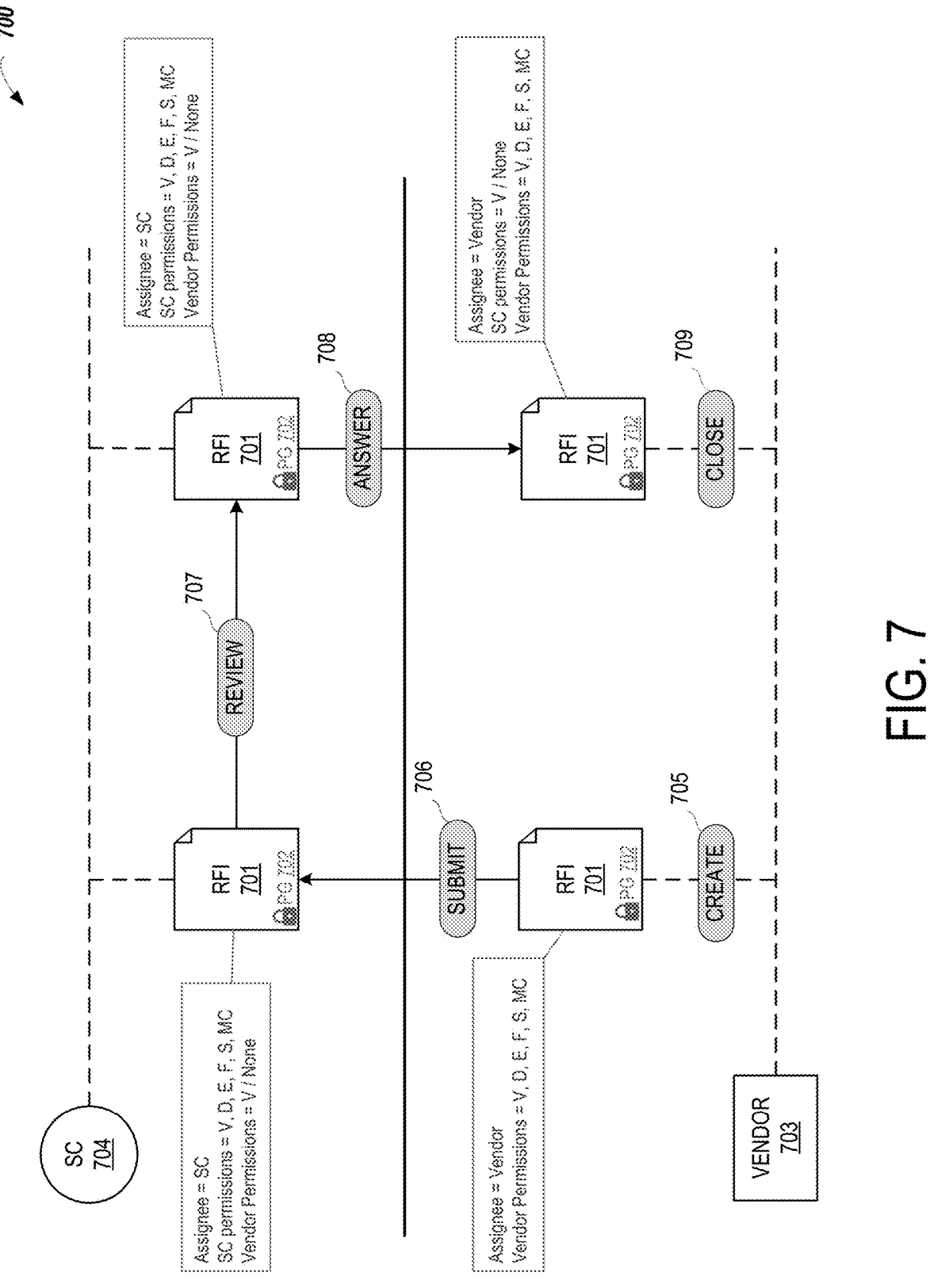
FIG. 7 depicts a flow diagram of an example workflow illustrating dynamic regulation of access to data objects of a construction project in accordance with aspects of the disclosed technology.

Turning now to FIG. 7, a flow diagram of an example workflow 700 that illustrates dynamic regulation of access to data objects associated with a given construction project in accordance with the disclosed technology is shown. The example workflow 700 is an RFI workflow that involves an RFI 701, a Vendor 703, and a Subcontractor (SC) 704. Further, the example workflow 700 assumes that a permissions group 702 (depicted in FIG. 7 as "PG 702") resembling the permissions group 602 of FIG. 6A has been configured for an RFI domain of the given construction project (e.g., a given member of the PG 702 can perform certain actions on RFIs that in are in a workflow and currently assigned to the given member), and that the Vendor 703 and the SC 704 are members of the PG 702.

The workflow 700 may begin at step 705, where the Vendor 703 may create the RFI 701, access to which is governed by at least the permissions group 702. At this point in the workflow 700, the Vendor 703 is the current assignee of the RFI 701—which may be reflected in the data defining the RFI 701 by way of an "Assignee" attribute of the RFI 701 having a value of "Vendor 703" (not shown)—and as dictated by the permissions group 702, has permissions to view, delete, edit, forward, submit, and mark complete the RFI 701.

At step 706, the Vendor may submit the RFI 701 to the SC 704, which may cause the value of the "Assignee" attribute of the RFI 701 to be updated from the Vendor 703 to the SC 704, indicating that the SC 704 is now the current assignee of the RFI 701. Thus, as dictated by the permissions group 702, at this point in the workflow 700, the SC 704 has permissions to view, delete, edit, forward, submit, and mark complete the RFI 701. Further, in line with the discussion above, depending on the implementation and if the RFI 701 is governed by any other permissions groups, the Vendor 703 may have reduced permissions with respect to accessing the RFI 701 because the conditions of PG 702 are no longer satisfied for the Vendor 703. For example, based on the Vendor's other group memberships, the Vendor might have only view permissions, no permissions to access the RFI 701, or some other set of permissions.

At step 707, the SC 704 may review the RFI 701 to determine what information has been requested by the Vendor 703. At step 708, the SC 704 may answer the RFI 701 by providing the information requested by the Vendor 703, which may cause the RFI 701 to be returned to the Vendor 703, at which point the value of the "Assignee" attribute of the RFI 701 may be updated from the SC 704 to the Vendor 703. Thus, as dictated by the permissions group 702, at this point in the workflow 700, the Vendor 703 regains permissions to view, delete, edit, forward, submit, and mark complete the RFI 701. Further, depending on the implementation and if the RFI 701 is governed by any other permissions groups, the access permissions for the SC 704 with respect to the RFI 701 may be reduced because the conditions of the PG 702 are no longer satisfied for the SC 704. For example, based on the SC's other group memberships, the SC might have only view permissions, no permissions to access the RFI 701, or some other set of permissions. In turn, the Vendor 703 may determine that the RFI has been satisfactorily answered, and at step 709, may close the RFI 701 by marking it complete, thus ending the workflow 700. After the workflow 700 has ended, the RFI 701 would no longer be governed by the permissions group 702 as it is no longer in a workflow.

Turning now to FIG. 8, an example computing environment 800 in which embodiments of the disclosed technology may be implemented is shown. As shown in FIG. 8, the computing environment 800 includes an example back-end computing platform 802 that may be communicatively coupled to one or more end-user devices 804. The back-end computing platform 802 may be configured to run a software application that incorporates the disclosed technology. The back-end computing platform 802 may comprise one or more software subsystems, which are depicted in FIG. 8 for the sake of discussion as permissions software subsystems 808a, domain 1 software subsystem 808b, and domain 2 software subsystem 808c. However, it should be understood that the back-end computing platform 802 may comprise fewer or more software subsystems than shown in FIG. 8. Each software subsystem may be responsible for carrying out one or more of the functions disclosed herein. Further, the back-end computing platform 802 may comprise a data store for storing data defining permissions group configurations, such as the permissions group data store 806.

The back-end computing platform 802 (e.g., one or more software subsystems of the back-end computing platform 802) may interact with one or more of the end-user devices 804 to carry out the functionality disclosed herein, which may include, as some non-limiting examples, causing the end-user device(s) to display one or more user interface views for enabling users to configure permissions groups, receiving, from the end-user device(s), data defining permissions groups configuration, receiving requests on behalf of users to access data objects stored by the back-end computing platform 802, and causing the end-user device(s) to display one or more user interface views for enabling users to perform permitted actions on data objects. These functionalities will be described in more detail below with reference to FIGS. 9 and 10, which depict flow charts of example processes in accordance with aspects of the disclosed technology.

Figure 10:
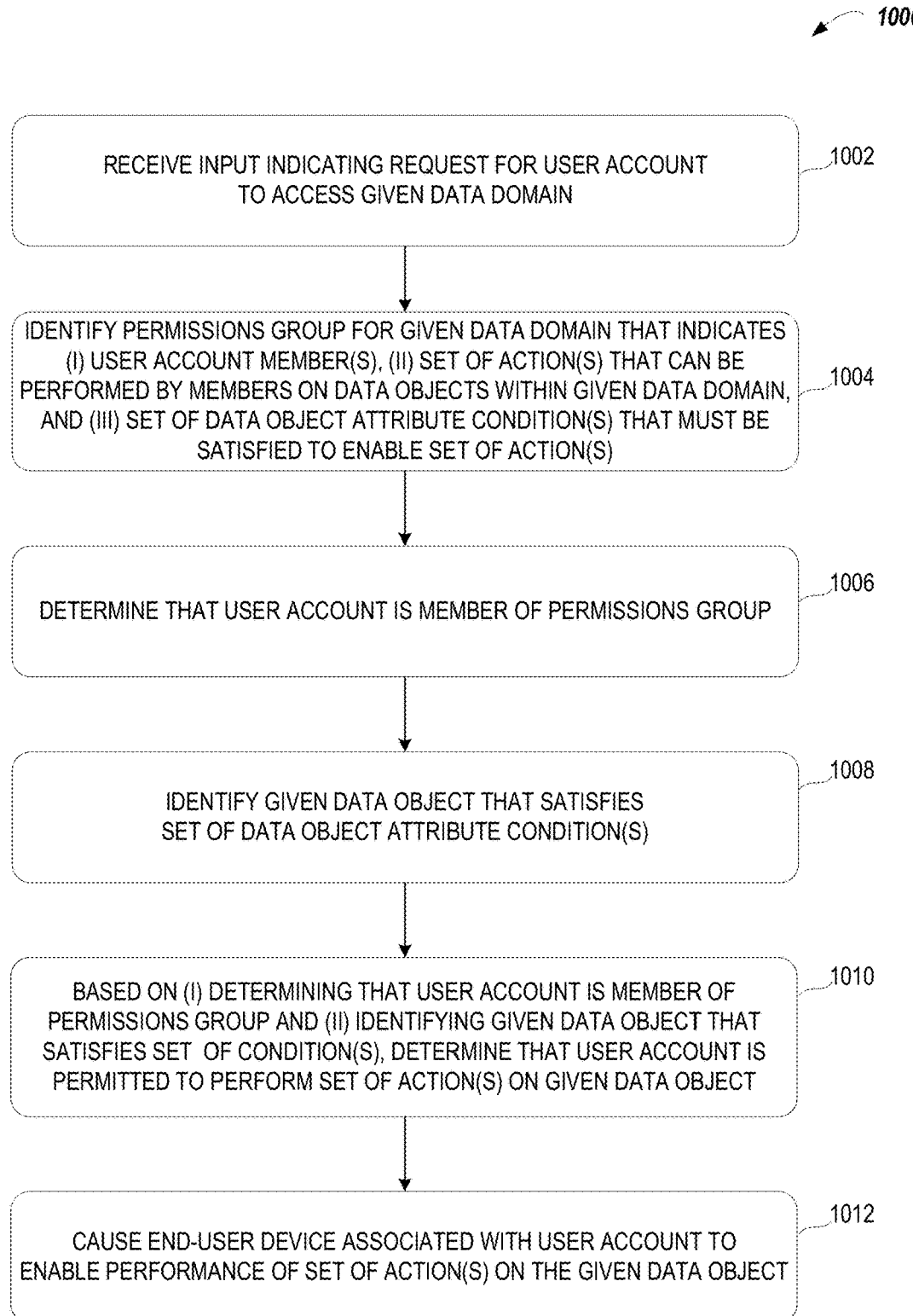
FIG. 10 depicts a flowchart of an example process that may be carried out for regulating access to data objects of a construction project based on one or more configured permissions groups in accordance with aspects of the disclosed technology.

FIGS. 9 and 10 include one or more operations, functions, or actions as illustrated by one or more operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in FIGS. 9 and 10 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 9 and 10 may represent circuitry and/or machinery that is wired or arranged to perform the specific functions in the process. Furthermore, the example processes 900 and 1000 may be described below as being performed by a back-end computing platform, which may be any one of the back-end computing platforms 102, 200, or 802 described above with reference to FIG. 1, 2, or 8. However, it should be understood that any one or more of the functions of the processes 900 or 1000 or any other functions discussed herein may be performed by one or more software subsystems of the back-end computing platform or one or more end-user devices communicatively coupled with the back-end computing platform, or shared between the back-end computing platform and one or more end-user devices.

With reference first to FIG. 9, a flow chart of one example process 900 For configuring a permissions group in accordance with the disclosed technology is shown. In practice, the example process 900 may be initiated when a user (e.g., a construction professional) accesses a software application incorporating the disclosed technology (e.g., a mobile application, a web application, etc.) via an end-user device associated with the user and navigates to one or more interface views for configuring permissions groups. For instance, the user may navigate to a software tool for configuring permissions and select an option to configure a new permissions group for a given construction project, which may serve as a request to configure a new permissions group for the given construction project. In turn, the end-user device may transmit data defining the request to the back-end computing platform.

At block 902, the back-end computing platform may receive the data defining the request to configure a new permissions group for the given construction project. In turn, at block 904, the back-end computing platform may enable the end-user device to receive user input indicating a configuration for the new permissions group. The function of enabling the end-user device to receive the user input indicating the configuration for the new permissions group may take various forms. As one possibility, this function may involve causing the end-user device to display one or more interface views including configuration options that enable the user to provide user input indicating the configuration for the new permissions group. For instance, the back-end computing platform may cause the end-user device to display one or more interface views similar to the views 500, 520, 600, or 620 in line with the discussion above with respect to FIGS. 5A, 5B, 6A, and 6B. As another possibility, enabling the end-user device to receive the user input indicating the configuration for the new permissions group may involve causing the end-user device to display one or more interface views that enable the user to import/upload a predefined configuration for the new permissions group. As yet another possibility, enabling the end-user device to receive the user input indicating the configuration for the new permissions group may involve causing the end-user device to display one or more interface views that enable the user to select a permissions group configuration template and perhaps provide additional user input to finalize the configuration for the new permissions group. Enabling the end-user device to receive the user input indicating the configuration for the new permissions group may take other forms as well.

In any event, the user may provide user input indicating the configuration for the new permissions group. For instance, in line with the discussion above, the user may provide user input indicating (i) a data domain (or domains) of the construction project to which the permissions group is to be applied, (ii) a set of one or more actions that can be performed by members of the permissions group on data objects within the data domain(s) that satisfy certain attribute conditions, (iii) a set of one or more conditions each indicating an attribute and one or more respective acceptable values for satisfying the condition, and (iv) one or more user accounts that are permitted to perform the set of one or more actions on data objects within the data domain(s) that satisfy the set of one or more conditions. In turn, the end-user device may transmit configuration data defining the new permissions group to the back-end computing platform.

At block 906, the back-end computing platform may receive the configuration data for the new permissions group indicating (i) the data domain(s) of the construction project to which the permissions group is to be applied, (ii) the set of one or more actions that can be performed by members of the permissions group on data objects within the data domain(s) that satisfy certain attribute conditions, (iii) the set of one or more conditions each indicating an attribute and one or more respective acceptable values for satisfying the condition, and (iv) the one or more user accounts that are permitted to perform the set of one or more actions on data objects within the data domain(s) that satisfy the set of one or more conditions.

At block 908, the back-end computing platform may cause the configuration data for the new permissions group to be stored. For instance, the back-end computing platform may interact with a data store, similar to the data store 806 shown in FIG. 8, to cause a data record including the data defining the new permissions group to be created and stored at the data store.

At block 910, the back-end computing platform may enable the end-user device associated with the user to display a representation of the configured permissions group.

After the permissions group has been configured, it may be modified (by the user who initially configured the group, or by a different user) by repeating one or more of the operations of the example process 900. Further, after the permissions group has been configured, it may be used to govern access to data objects stored at the back-end computing platform.

FIG. 10 depicts a flow diagram of an example process 1000 for regulating access to data objects of a construction project based on one or more permissions groups that have been configured in accordance with the disclosed technology.

The example process 1000 may begin at block 1002, where the back-end computing platform may receive an access request on behalf of a given user account to access a given data domain of a given construction project. The data access request may take various forms.

In practice, the data access request may be initiated when a user (e.g., a construction professional) accesses a software application incorporating the disclosed technology (e.g., a mobile application, a web application, etc.) via an end-user device user and provides user input indicating a request to access data for the given construction project. For instance, as one possibility, the user may navigate to a software tool that corresponds to a particular data domain of the given construction project (e.g., an RFI tool corresponding to the RFI domain, a Timesheet tool corresponding to the Timesheet domain, etc.), in which case the function of accessing the software tool—for example, by providing a user input selection to launch the software tool—may comprise the access request. As another possibility, the user may navigate to one or more interface views for accessing one or more given data objects within one or more given data domains. For instance, the user may navigate to a person-alized dashboard view that enables the user to access a set of data objects that are currently assigned to or were created by the user, which may comprise data objects from various data domains. In such an instance, the function of navigating to the dashboard view—for example, by providing a user input selection to launch the dashboard—may comprise the access request, which may include a collective set of indi-vidual requests to access each of the data objects and/or their corresponding data domains included in the dashboard view. As yet another possibility, the act of logging in to the software application may comprise the user input indicating the access request. As still a further possibility, the user may receive a notification (e.g., an email communication, a text communication, an application push notification, etc.) indi-cating a data object (e.g., if a data object has been shared with the user, etc.) and a selectable link to access the data object, and selecting the link may comprise user input indicating the access request. The access request may take other forms as well.

In any event, based on the user input provided by the user, the end-user device may transmit to the back-end computing platform data indicating a request for a given user account associated with the user to access data for the given con-struction project. In this respect, the data indicating the request may indicate a particular data domain or one or more given data objects within one or more particular data domains.

In turn, at block 1004, the back-end computing platform may identify one or more permissions groups based on the access request. The function of identifying one or more permissions groups based on the access request may take various forms. In general, identifying the one or more permissions groups based on the access request may involve the back-end computing platform interacting with a data store accessible to the back-end computing platform (e.g., the permissions group data store 806 shown in FIG. 8) that is responsible for storing permissions group configuration data to obtain data for the one or more permissions groups. As one possibility, identifying the one or more permissions groups may involve identifying at least one data domain indicated in the access request, and for each given data domain, identifying a respective set of one or more permis-sions groups that are each configured to govern data objects within the given data domain. In this respect, the back-end computing platform may obtain, from the data store, one or more permissions groups that are each configured to govern data objects within the given data domain. For instance, the back-end computing platform may query the data store for configuration data for all permissions groups configured to govern data objects within the given data domain.

As another possibility, identifying the one or more per-missions groups may involve identifying one or more given data objects indicated in the access request, and for each given data object, identifying a respective set of one or more permissions groups that are each configured to govern data objects that are within the same domain as the given data object. In this respect, the back-end computing platform may obtain, from the data store, one or more permissions groups that are each configured to govern data objects within the same domain as the given data object. For instance, the back-end computing platform may query the data store for configuration data for all permissions groups configured to govern data objects within the same domain as the given data object.

As yet another possibility, identifying the one or more permissions groups may involve identifying each permis-sions group of which the given user account is a member. In this respect, the back-end computing platform may obtain, from the data store, one or more permissions groups that each indicate the given user account as a member (e.g., as discussed further below at block 1006). For instance, the back-end computing platform may query the data store for configuration data for all permissions groups that indicate the given user account as a member. In some implementa-tions, this function may further involve culling the identified permissions groups based on one or more data domains or types of data objects indicated in the access request.

As a further possibility, identifying the one or more permissions groups may involve a combination of the examples above. The one or more permissions groups may be identified in other ways as well.

In line with the discussion above, each identified permis-sions group may indicate (i) one or more data domains, (ii) a set of one or more permissible actions, (iii) a set of one or more data object attribute conditions, and (iv) a set of one or more members.

In some implementations where the permissions group(s) are identified based on one or more data domains and/or one or more given data objects as mentioned above, at block 1006, the back-end computing platform may determine, for each permissions group, whether or not the given user account is a member. Any permissions groups to which the given user account does not belong may be removed from further consideration.

At block 1008, the back-end computing platform may identify at least one given data object that satisfies a respective data object attribute condition set of a given permissions group. This function may take various forms. As one possibility, for each respective permissions group identified at blocks 1004 and/or 1006, the back-end computing platform may identify one or more given data objects that are governed by the respective permissions group and then evaluate each given data object's data object attributes and corresponding attribute values to determine whether or not they satisfy the condition set. Other examples are also possible.

At block 1010, for each given data object identified at block 1008, based on determining that (i) the given user account is a member of the given permissions group that governs access to the given data object and (ii) the given data object satisfies the respective attribute condition set indicated in the given permissions group, the back-end computing platform may determine that the given user account is permitted to perform the respective set of actions indicated in the given permissions group that governs access to the given data object.

In turn, at block 1012, for each given data object identified at block 1008, the back-end computing platform may cause the end-user device associated with the user to enable performance of the set of actions on the given data object. The function of enabling performance of the set of actions on the given data object may take various forms. As one possibility, the back-end computing platform may cause the end-user device to display a representation of the given data object, along with options to perform the set of actions. For instance, if the given data object is an RFI and the set of actions includes view, and edit permissions, the back-end computing platform may cause the end-user device to display an editable representation of the RFI that enables the user to edit one or more attribute fields of the RFI. On the other hand, actions that are not included within the aggregate set of permissions that the user account has access to, by virtue of the user account's group memberships, may not be displayed to the user, or may be displayed in such a way (e.g., a grayed-out visualization) that indicates the lack of permission. For instance, if the user does not have access to a delete permission, the displayed representation of the RFI may not include any selectable option to delete the RFI. Other examples are also possible.

As another possibility, the back-end computing platform may cause the end-user device to display a listing of all given data objects identified at block 1008, whereby the user can select one or more of the given data objects and perform one or more permissible actions. The function of enabling performance of the set of actions on the given data object may take other forms as well.

In some implementations, the back-end computing platform may be configured to monitor changes to attribute values of data objects that may require access to the data objects to be updated. For instance, as described above with reference to FIGS. 6A, 6B, and 7, a given permissions group may dictate that access to RFIs that are in a workflow is to be regulated based on an "Assignee" attribute value of the RFIs. In such instances, for example, the back-end computing platform may monitor RFIs that are indicated as being in a workflow and dynamically update access to the RFIs based on which user account is designated as the assignee. For instance, with reference to FIG. 7, after the Vendor 703 submits the RFI at step 706, the respective "Assignee" attribute value of the RFI 701 may change from indicating the Vendor 703 to indicating the SC 704. In turn, the back-end computing platform may cause the respective access of each of the Vendor 703 and the SC 704 to be updated in accordance with one or more permissions groups that govern the RFI 701.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

The invention claimed is:

1. A computing platform comprising:

at least one network interface;

at least one processor;

at least one non-transitory computer-readable medium; and program instructions stored on the at least one non-transitory computer-readable medium that are executable by the at least one processor such that the computing platform is configured to:

receive configuration data defining a permissions group for a construction project, the configuration data indicating a data domain of the construction project and a set of actions that are permitted to be performed on data objects within the data domain that satisfy a condition comprising a particular value for a particular data object attribute;

after receiving the configuration data defining the permissions group, receive a data access request, on behalf of a user account, for a given data object within the data domain;

determine that the user account is a member of the permissions group;

determine that the given data object within the data domain comprises the particular data object attribute having the particular value and thereby satisfies the condition;

based on determining that (i) the user account is a member of the permissions group and (ii) the given data object satisfies the condition, determine that the user account is permitted to perform the set of actions on the given data object;

cause an end-user device associated with the user account to enable performance of the set of actions on the given data object by the user account;

receive, from the end-user device, input indicating a command to execute a given action from the set of actions on the given data object;

based on the input indicating the command, execute the given action, wherein executing the given action causes the particular value for the particular data object attribute to change;

based on the change to the particular value for the particular data object attribute, determine that (i) the given data object within the data domain no longer satisfies the condition and (ii) the user account is no longer permitted to perform the set of actions on the given data object; and cause the end-user device associated with the user account to disable performance of the set of actions on the given data object by the user account.

2. The computing platform of claim 1, wherein the particular value is a first particular value and the condition comprises a set of particular values for the particular data object attribute, the set of particular values including the first particular value and one or more second particular values for the particular data object attribute, and wherein the program instructions that are executable by the at least one processor such that the computing platform is configured to determine that the given data object satisfies the condition comprise program instructions that are executable by the at least one processor such that the computing platform is configured to:

determine that the given data object comprises the particular data object attribute having at least one of the two or more particular values in the set of particular values for the particular data object attribute and thereby satisfies the condition.

3. The computing platform of claim 1, wherein the condition comprises a respective particular value for each of two or more data object attributes, and wherein the program instructions that are executable by the at least one processor such that the computing platform is configured to determine that the given data object satisfies the condition comprise program instructions that are executable by the at least one processor such that the computing platform is configured to:

determine that the given data object comprises the respective particular value for each of the two or more data object attributes and thereby satisfies the condition.

4. The computing platform of claim 1, wherein the program instructions that are executable by the at least one processor such that the computing platform is configured to cause the end-user device associated with the user account to enable performance of the set of actions on the given data object comprise program instructions that are executable by the at least one processor such that the computing platform is configured to:

cause the end-user device to display a representation of the given data object for receiving one or more user inputs in accordance with the set of actions.

5. The computing platform of claim 1, further comprising program instructions stored on the at least one non-transitory computer-readable medium that are executable by the at least one processor such that the computing platform is configured to:

determine a subset of the data objects within the data domain comprise the particular data object attribute having the particular value and thereby satisfy the condition;

detect one or more changes to one or more values of data object attributes of the data objects within the data domain;

based on the one or more changes, determine that (i) one or more data objects within the subset no longer satisfies the condition and (ii) the user account is no longer permitted to perform the set of actions on the one or more data objects; and cause the end-user device associated with the user account to disable performance of the set of actions on the one or more data objects by the user account.

6. The computing platform of claim 1, wherein the data access request indicates a given data domain of the construction project, the computing platform further comprising program instructions stored on the at least one non-transitory computer-readable medium that are executable by the at least one processor such that the computing platform is configured to:

determine that the given data domain indicated in the data access request comprises the data domain indicated in the configuration data defining the permissions group and thereby determine that the data access request is to be governed by the permissions group.

7. The computing platform of claim 1, wherein the data access request indicates the user account, and wherein the program instructions that are executable by the at least one processor such that the computing platform is configured to determine that the user account is a member of the permissions group comprise program instructions that are executable by the at least one processor such that the computing platform is configured to:

identify all permissions groups of which the user account is a member.

8. The computing platform of claim 1, wherein the permissions group is a first permissions group and the set of actions is a first set of actions, the computing platform further comprising program instructions stored on the at least one non-transitory computer-readable medium that are executable by the at least one processor such that the computing platform is configured to:

determine that the user account is also a member of a second permissions group that indicates a second set of actions that are permitted to be performed on data objects within the data domain that satisfy the condition comprising the particular value for the particular data object attribute;

determine that the second set of actions has a broader scope of permission than the first set of actions and thereby determine that the second set of actions is to govern the data access request; and cause the end-user device associated with the user account to enable performance of the second set of actions on the given data object by the user account.

9. A non-transitory computer-readable medium, wherein the non-transitory computer-readable medium is provisioned with program instructions that, when executed by at least one processor, cause a computing platform to:

receive configuration data defining a permissions group for a construction project, the configuration data indicating a data domain of the construction project and a set of actions that are permitted to be performed on data objects within the data domain that satisfy a condition comprising a particular value for a particular data object attribute;

after receiving the configuration data defining the permissions group, receive a data access request, on behalf of a user account, for a given data object within the data domain;

determine that the user account is a member of the permissions group;

determine that the given data object within the data domain comprises the particular data object attribute having the particular value and thereby satisfies the condition;

based on determining that (i) the user account is a member of the permissions group and (ii) the given data object satisfies the condition, determine that the user account is permitted to perform the set of actions on the given data object;

cause an end-user device associated with the user account to enable performance of the set of actions on the given data object by the user account;

receive, from the end-user device, input indicating a command to execute a given action from the set of actions on the given data object;

based on the input indicating the command, execute the given action, wherein executing the given action causes the particular value for the particular data object attribute to change;

based on the change to the particular value for the particular data object attribute, determine that (i) the given data object within the data domain no longer satisfies the condition and (ii) the user account is no longer permitted to perform the set of actions on the given data object; and cause the end-user device associated with the user account to disable performance of the set of actions on the given data object by the user account.

10. The non-transitory computer-readable medium of claim 9, wherein the particular value is a first particular value and the condition comprises a set of particular values for the particular data object attribute, the set of particular values including the first particular value and one or more second particular values for the particular data object attribute, and wherein the program instructions that, when executed by at least one processor, cause the computing platform to determine that the given data object satisfies the condition comprise program instructions that, when executed by at least one processor, cause the computing platform to:

determine that the given data object comprises the particular data object attribute having at least one of the two or more particular values in the set of particular values for the particular data object attribute and thereby satisfies the condition.

11. The non-transitory computer-readable medium of claim 9, wherein the condition comprises a respective particular value for each of two or more data object attributes, and wherein the program instructions that, when executed by at least one processor, cause the computing platform to determine that the given data object satisfies the condition comprise program instructions that, when executed by at least one processor, cause the computing platform to:

determine that the given data object comprises the respective particular value for each of the two or more data object attributes and thereby satisfies the condition.

12. The non-transitory computer-readable medium of claim 9, wherein the program instructions that, when executed by at least one processor, cause the computing platform to cause the end-user device associated with the user account to enable performance of the set of actions on the given data object comprise program instructions that, when executed by at least one processor, cause the computing platform to:

cause the end-user device to display a representation of the given data object for receiving one or more user inputs in accordance with the set of actions.

13. The non-transitory computer-readable medium of claim 9, wherein the non-transitory computer-readable medium is also provisioned with program instructions that, when executed by at least one processor, cause the computing platform to:

determine a subset of the data objects within the data domain comprise the particular data object attribute having the particular value and thereby satisfy the condition;

detect one or more changes to one or more values of data object attributes of the data objects within the data domain;

based on the one or more changes, determine that (i) one or more data objects within the subset no longer satisfies the condition and (ii) the user account is no longer permitted to perform the set of actions on the one or more data objects; and cause the end-user device associated with the user account to disable performance of the set of actions on the one or more data objects by the user account.

14. The non-transitory computer-readable medium of claim 9, wherein the data access request indicates a given data domain of the construction project, and wherein the non-transitory computer-readable medium is also provisioned with program instructions that, when executed by at least one processor, cause the computing platform to:

determine that the given data domain indicated in the data access request comprises the data domain indicated in the configuration data defining the permissions group and thereby determine that the data access request is to be governed by the permissions group.

15. The non-transitory computer-readable medium of claim 9, wherein the data access request indicates the user account, and wherein the program instructions that, when executed by at least one processor, cause the computing platform to determine that the user account is a member of the permissions group comprise program instructions that, when executed by at least one processor, cause the computing platform to:

identify all permissions groups of which the user account is a member.

16. The non-transitory computer-readable medium of claim 9, wherein the permissions group is a first permissions group and the set of actions is a first set of actions, and wherein the non-transitory computer-readable medium is also provisioned with program instructions that, when executed by at least one processor, cause the computing platform to:

determine that the user account is also a member of a second permissions group that indicates a second set of actions that are permitted to be performed on data objects within the data domain that satisfy the condition comprising the particular value for the particular data object attribute;

determine that the second set of actions has a broader scope of permission than the first set of actions and thereby determine that the second set of actions is to govern the data access request; and cause the end-user device associated with the user account to enable performance of the second set of actions on the given data object by the user account.

17. A method carried out by a computing platform, the method comprising:

receiving configuration data defining a permissions group for a construction project, the configuration data indicating a data domain of the construction project and a set of actions that are permitted to be performed on data objects within the data domain that satisfy a condition comprising a particular value for a particular data object attribute;

after receiving the configuration data defining the permissions group, receiving a data access request, on behalf of a user account, for a given data object within the data domain;

determining that the user account is a member of the permissions group;

determining that the given data object within the data domain comprises the particular data object attribute having the particular value and thereby satisfies the condition;

based on determining that (i) the user account is a member of the permissions group and (ii) the given data object satisfies the condition, determining that the user account is permitted to perform the set of actions on the given data object;

causing an end-user device associated with the user account to enable performance of the set of actions on the given data object by the user account;

receiving, from the end-user device, input indicating a command to execute a given action from the set of actions on the given data object;

based on the input indicating the command, executing the given action, wherein executing the given action causes the particular value for the particular data object attribute to change;

based on the change to the particular value for the particular data object attribute, determining that (i) the given data object within the data domain no longer satisfies the condition and (ii) the user account is no longer permitted to perform the set of actions on the given data object; and causing the end-user device associated with the user account to disable performance of the set of actions on the given data object by the user account.

18. The method of claim 17, wherein causing the end-user device associated with the user account to enable performance of the set of actions on the given data object comprises:

causing the end-user device to display a representation of the given data object for receiving one or more user inputs in accordance with the set of actions.

19. The method of claim 17, further comprising:

determining a subset of the data objects within the data domain comprise the particular data object attribute having the particular value and thereby satisfy the condition;

detecting one or more changes to one or more values of data object attributes of the data objects within the data domain;

based on the one or more changes, determining that (i) one or more data objects within the subset no longer satisfies the condition and (ii) the user account is no longer permitted to perform the set of actions on the one or more data objects; and causing the end-user device associated with the user account to disable performance of the set of actions on the one or more data objects by the user account.

20. The method of claim 17, wherein the permissions group is a first permissions group and the set of actions is a first set of actions, and wherein the method further comprises:

determining that the user account is also a member of a second permissions group that indicates a second set of actions that are permitted to be performed on data objects within the data domain that satisfy the condition comprising the particular value for the particular data object attribute;

determining that the second set of actions has a broader scope of permission than the first set of actions and thereby determine that the second set of actions is to govern the data access request; and causing the end-user device associated with the user account to enable performance of the second set of actions on the given data object by the user account.

* * * * *